United States Patent
Tanigawa et al.

(10) Patent No.: US 7,233,589 B2
(45) Date of Patent: Jun. 19, 2007

(54) COMMUNICATION SYSTEM AND COMMUNICATION METHOD

(75) Inventors: Keiko Tanigawa, Kawasaki (JP);
Kazuma Yumoto, Hachiouji (JP);
Kenta Shiga, Yokohama (JP); Toru Hoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1170 days.

(21) Appl. No.: 10/231,262

(22) Filed: Aug. 30, 2002

(65) Prior Publication Data

US 2004/0001480 A1 Jan. 1, 2004

(30) Foreign Application Priority Data

Jun. 4, 2002 (JP) .............................. 2002-162940

(51) Int. Cl.
*H04L 12/66* (2006.01)

(52) U.S. Cl. ....................................... 370/352; 370/493
(58) Field of Classification Search ..................... None
See application file for complete search history.

(56) References Cited

U.S. PATENT DOCUMENTS

| | | | | |
|---|---|---|---|---|
| 2002/0073142 A1* | 6/2002 | Moran | ........................ | 709/203 |
| 2003/0021290 A1* | 1/2003 | Jones | ........................ | 370/466 |
| 2003/0126213 A1* | 7/2003 | Betzler | ........................ | 709/206 |
| 2003/0149774 A1* | 8/2003 | McConnell et al. | ........ | 709/227 |
| 2003/0210770 A1* | 11/2003 | Krejcarek | ................. | 379/88.17 |

OTHER PUBLICATIONS

Nikkei Communication, Nov. 5, 2001, pp. 106-113.
R. Perera, "Instant Messaging Gets Down to Business", PC WORLD.COM, (http://www.pcworld.com) , Nov. 15, 2001.
Mahy et al, "A Multi-Party Application Framework for SIP", SIPPING Working Group Internet Draft, Feb. 2002.
"Instant Messaging", PC WORLD.COM, (http://www.pcworld.com), May 22, 2000.
M. Goldberg, "Generation IM", Yahoo ! Internet Life, Apr. 2002, pp. 1-6.
D. Willmott, "Which IM Program Is for You?", Yahoo ! Internet Life, Apr. 2002.
J. Caplan, "amazing IM Tricks ! ", Yahoo ! Internet Life, Apr. 2002.
J. Caplan, "Amazing IM Tricks ! ", Yahoo ! Internet Life, Apr. 2002.

* cited by examiner

*Primary Examiner*—Phirin Sam
(74) *Attorney, Agent, or Firm*—Mattingly, Stanger, Malur & Brundidge, P.C.

(57) ABSTRACT

The usage of communication systems is improved. An IM server 4 manages presence information regarding each of IM clients and usable media and user information such that each of the IM clients can obtain these kinds of information. In order to perform text chatting, the IM server 4 manages a connection between each of the IM clients participating the chat and the IM server 4, merges text from each of the participating IM clients and distributes the result to each of the participating IM clients. In order to perform voice chatting, an AP server 5 manages a connection between each of the IM clients participating the chat and an MD server 6, mixes voice from each of the participating IM clients except for a focused IM client and distributes the result to the focused participating IM clients. This processing is performed for each of the participating IM clients.

12 Claims, 19 Drawing Sheets

FIG.3

PRESENCE INFORMATION MANAGEMENT TABLE 488

| ACCOUNT NAMES 431 | CLIENT ADDRESSES 432 | CLIENT NICKNAMES 433 | AUTHENTI-CATION KEYS 434 | PRESENCE 435 | USABLE MEDIA 436 | CONFERENCE ADDRESSES 437 | CONFERENCE NICKNAMES 438 | BUDDY LIST 439 |
|---|---|---|---|---|---|---|---|---|
| Client A | *.*.*.* | taro | ** | text/voice | text/voice | *.*.*.*/ *.*.*.*** | room1 | A,B,C,D,E,F,G... |
| Client B | *.*.*.* | jiro | ** | off | text/voice | *.*.*.*** | | A,B,C,D,E,F,G... |
| Client C | *.*.*.* | ichiro | ** | idle | text | *.*.*.*** | | A,B,C,D,E,F,G... |
| Client D | *.*.*.* | hanako | ** | text | text | *.*.*.*** | room1 | A,B,C,D,E,F,G... |
| Client E | *.*.*.* | hanako | ** | voice | voice | *.*.*.*** | room1 | A,B,C,D,E,F,G... |
| Client F | *.*.*.* | yoshi | ** | text | text | *.*.*.*** | room1 | A,B,C,D,E,F,G... |
| Client G | *.*.*.* | yoshi | ** | voice | voice | *.*.*.*** | room1 | A,B,C,D,E,F,G... |
| ........ | | | | | | | | ........ |

440

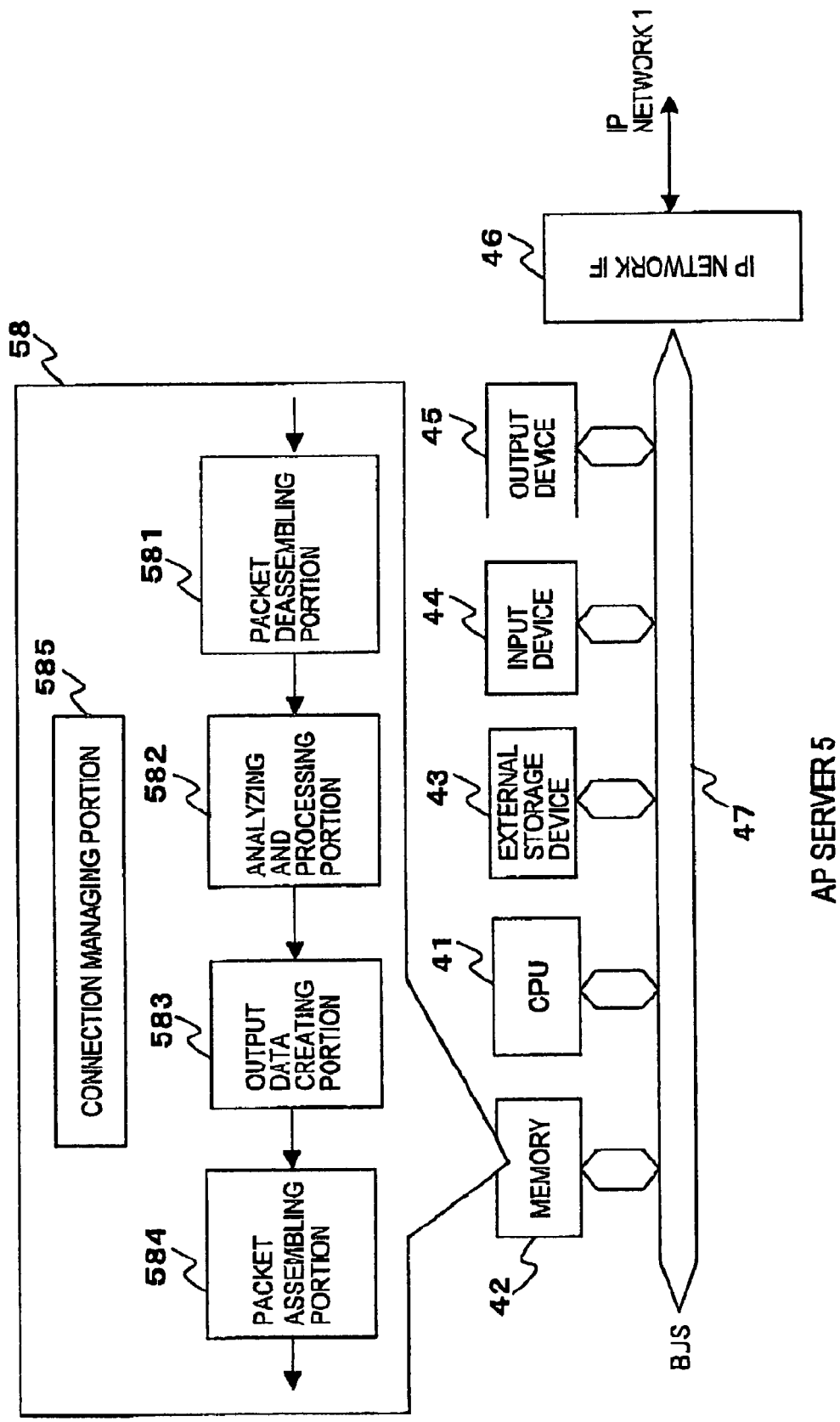

FIG.5

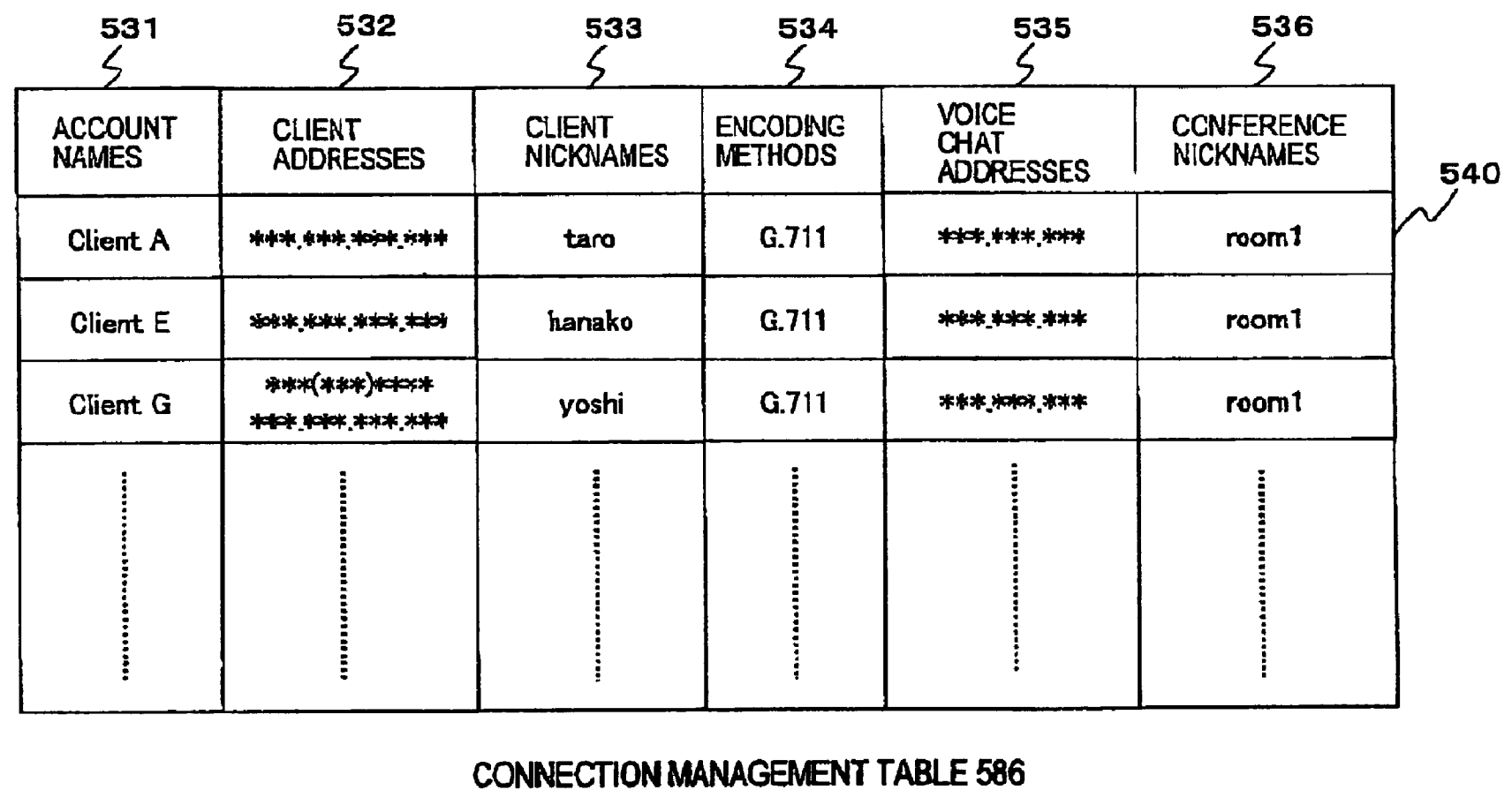

| ACCOUNT NAMES 531 | CLIENT ADDRESSES 532 | CLIENT NICKNAMES 533 | ENCODING METHODS 534 | VOICE CHAT ADDRESSES 535 | CONFERENCE NICKNAMES 536 |
|---|---|---|---|---|---|
| Client A | *.*.*.* | taro | G.711 | *.*.*** | room1 |
| Client E | *.*.*.* | hanako | G.711 | *.*.*** | room1 |
| Client G | *(*)*.*.*.* | yoshi | G.711 | *.*.*** | room1 |
| ......... | ......... | ......... | ......... | ......... | ......... |

540

CONNECTION MANAGEMENT TABLE 586

FIG7

```
<provision name="Taro">          /631
  <user account=" client B "     /632
        password=" z9y8x7 "      /633
        addr=" ***.***.*** " />  /634
  <imsrv addr=" ***.***.*** " />
  <voipsrv addr=" ***.***.**** " />
</provision>
```

PROFILE DATA 686

COMMUNICATION SYSTEM AND COMMUNICATION METHOD

BACKGROUND OF THE INVENTION

The present invention relates to a communication technology such as Instant Messaging (IM).

A communication technology called IM is gathering attentions. Sometimes, a matter to talk with the other party may not need a rapid response through a telephone. However, if an e-mail containing the matter is sent through an E-mail, it is not clear when the other party reads (that is, when his/her reply is obtained). IM has a time characteristic that is intermediate between the telephone and the e-mail. In IM, a current status (which may be called presence information), such as online or offline or the ability to respond, of each party is published. Thus, in response to presence information of friends using the same IM system over the Internet, a tool to be used for communication with friends, such as a chat and an e-mail, can be selected.

Presently, IM systems are released from many venders, and IM clients, each of which is application software to use a respective IM system, are distributed. However, there is no compatibility among IM systems of the respective venders. As a result, communication cannot be performed between the IM clients of the different venders. Thus, the standardization is started from a need for the interconnectivity. In Instant Messaging & Presence Protocol (IMPP) working group of Internet Engineering Task Force (IETF), the architecture, the message integration and the security (such as authentication and encryption) relating to IM are being discussed. A model is defined for Require for Comment (RFC) 2778 while a protocol requirements are defined for RFC 2779.

Conventionally, the multi-party connection (group chat) in IM is mainly used just for fun(hobby use), such as gossiping. However, recently, study for using the group chat for business has been started. Here, it is noted that the text-based group chat may be not enough for the business uses in many cases. For example, inputting Japanese language takes time. In addition, in order to express a complicated matter or a shade of meaning, which is hard to be understood from a document, the voice support is needed. In the one-to-one (Peer-to-Peer) technology, the expansion into communication using multimedia has been started. The first reference (Nikkei Communication, Nov. 5, 2001, pgs. 106 to 113) proposes such usage of multimedia that a meeting is held by using a voice chat or by exchanging files.

SUMMARY OF THE INVENTION

When a communication technology is applied to the business purpose, it is desirable that not only text but also voice can be handled easily in addition to participation in a conference without leaving his/her desk and/or participation in conference even from the outside of his office.

However, the conventional IM systems are not ready for a group chat using multimedia. By using the system disclosed in the reference 1, switching between text and voice can be performed in a one-to-one chat. However, no consideration is given to the switching between text and voice in a group chat.

There is a television conference system as a technology for implementing a group chat other than the IM system. However, the conventional television conference system requires the buddies to gather in a room such as a television conference room at a scheduled conference time. In some cases, users must call to a predetermined virtual conference room. That is, the conventional television conference system lacks flexibility.

The present invention was made in view of these circumstances. It is an object of the present invention to improve handling (dealing) of a communication system. More specifically, it is an object of the present invention to achieve group chat using multimedia. For example, the switching between a group chat through electronic documents and a group chat through voice and/or the switching between a one-to-one chat through voice and a group chat through voice can be handled flexibly.

In order to achieve the objects, the present invention implements a chat between/among IM clients by using an IM presence management server which manages presence information indicating a state of each of the IM clients; a VoIP communication connection management server which manages a connection for voice chatting using VoIP (Voice over Internet Protocol); and a media server which implements multi-party voice communication by mixing voice data.

For example, the IM presence management server manages, as to each of the IM clients, presence information of the IM client, information regarding media (including text and voice) which can be used for a chat by the IM client, and user information of the IM client, and in accordance with an instruction from an IM client, provides the IM client in question with the presence information, usable media information and user information of each of the IM clients set as buddies of the IM client in question.

In accordance with information of each of IM clients (called as text participating clients) participating in a text chat, which is notified from the IM client, the IM presence management server manages a connection between/among the text participating clients and the IM presence management server, merges text data sent from each of the text participating clients and distributes the result to each of the text participating clients.

The VoIP communication connection management server manages a connection between/among each of IM clients (called as voice participating clients) and the media server in accordance with information of the voice participating clients participating in a voice chat, which is notified from the IM client or the IM presence management server.

The media server performs processing for mixing voice data sent from each of the voice participating clients except for one of the voice participating clients set as a focused client and for distributing the result data thus mixed to the focused client. These processing is performed as focused clients on all of the voice participating clients.

BRIEF DESCRIPTION OF THE DRAWINGS

FIG. 3 is a diagram showing an example of a presence information management table 488 used by a connection managing portion 487 shown in FIG, 2 for managing presence information;

FIG. 4 is a schematic configuration diagram of an AP server 5 shown in FIG. 1;

FIG. 5 is a diagram showing an example of a VoIP connection management table 586 used by a connection managing portion 585 shown in FIG. 4 for managing voice chat;

FIG. 7 is a diagram showing an example of profile data 686 required when an IM client participates in an IM;

DESCRIPTION OF THE PREFERRED EMBODIMENTS

Embodiments of the present invention will be described below.

Figure 1:
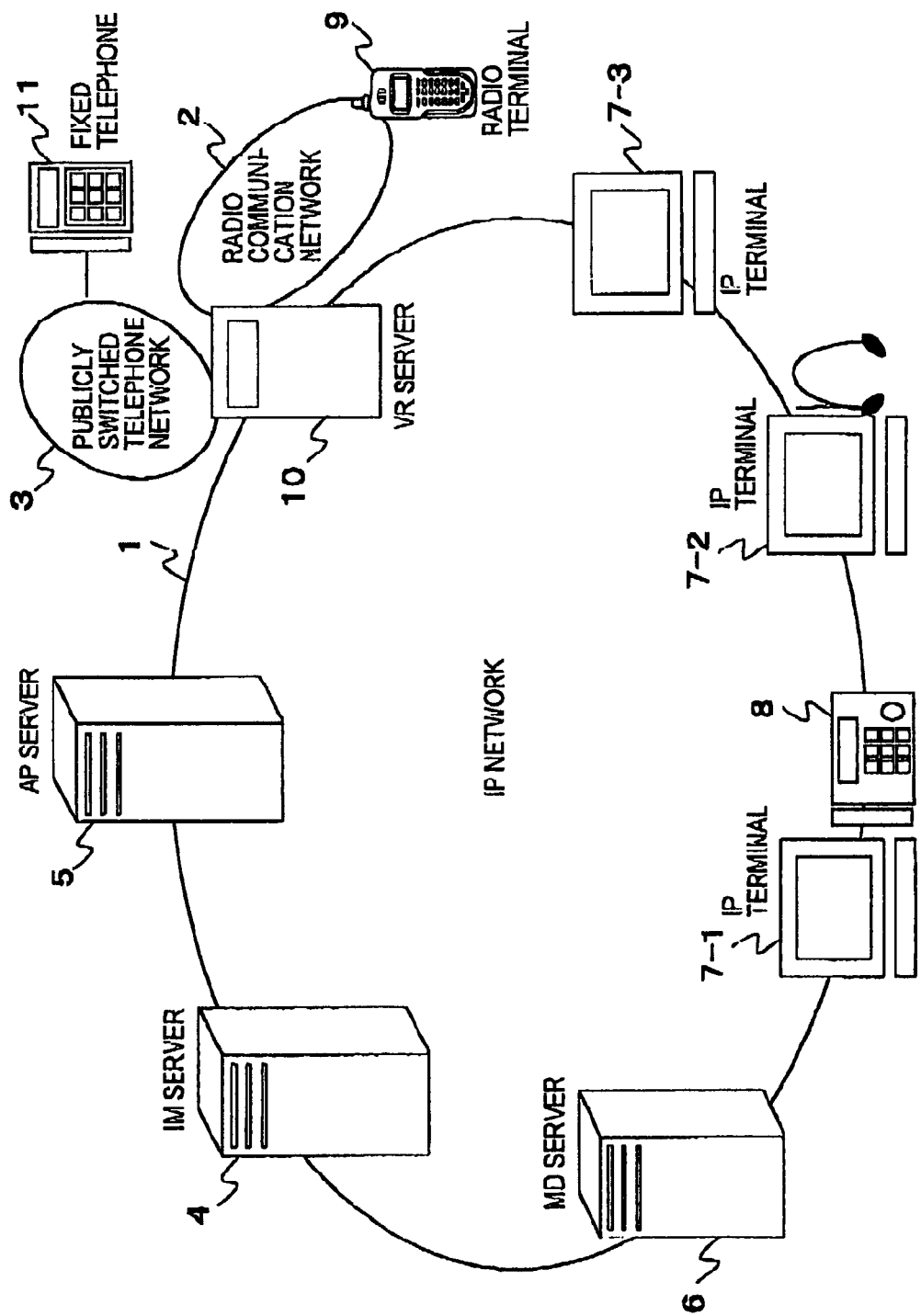
FIG. 1 is a schematic diagram of an IM-VoIP (Voice over Internet Protocol) interconnecting system, which is a communication system to which one embodiment of the present invention is applied.

FIG. 1 is a schematic diagram of an IM-Voice over Internet Protocol (VoIP) interconnecting system, which is a communication system to which one embodiment of the present invention is applied.

As shown in FIG. 1, an IP network 1 is connected to an IM presence managing Server (called as IM server hereinafter) 4 which manages presence information of an IM client, a VoIP communication connection managing server (called as AP server hereinafter) 5 which manages connection for a voice chat using VoIP, a media server (called as MD server hereinafter) 6 which implements multi-party voice speech by mixing voice data, a plurality of IP terminals 7-1 to 7-3 in each of which an IM client is installed, and a voice relay server (called as VR server hereinafter) 10 which performs voice relay among a radio communication network 2, a publicly switched telephone network (PSTN) 3 and the IP network 1. Here, a radio terminal 9, such as a mobile telephone, in which an IM client is installed, is connected to the radio communication network 2. A fixed telephone 11 in which an IM client is installed is connected to the publicly switched telephone network 3.

In the above-described configuration, the IP terminals 7-1 to 7-3 can perform a multi-media chat using the IM server 4, the AP server 5 and the MD server 6 by independently or combination with the VoIP telephone 8, the radio terminal 9 or the fixed telephone 11. For example, in a group or in one-to-one, a chat through electronic documents such as text (called as text chat hereinafter) and a chat through voice (called as voice chat hereinafter) can be performed.

Next, each of devices included in the IM-VoIP interconnecting system will be described.

First of all, the IM server 4 will be described.

As described above, the IM server 4 manages presence information of the IM clients. A schematic configuration of the IM server 4 is shown in FIG. 2.

Figure 2:
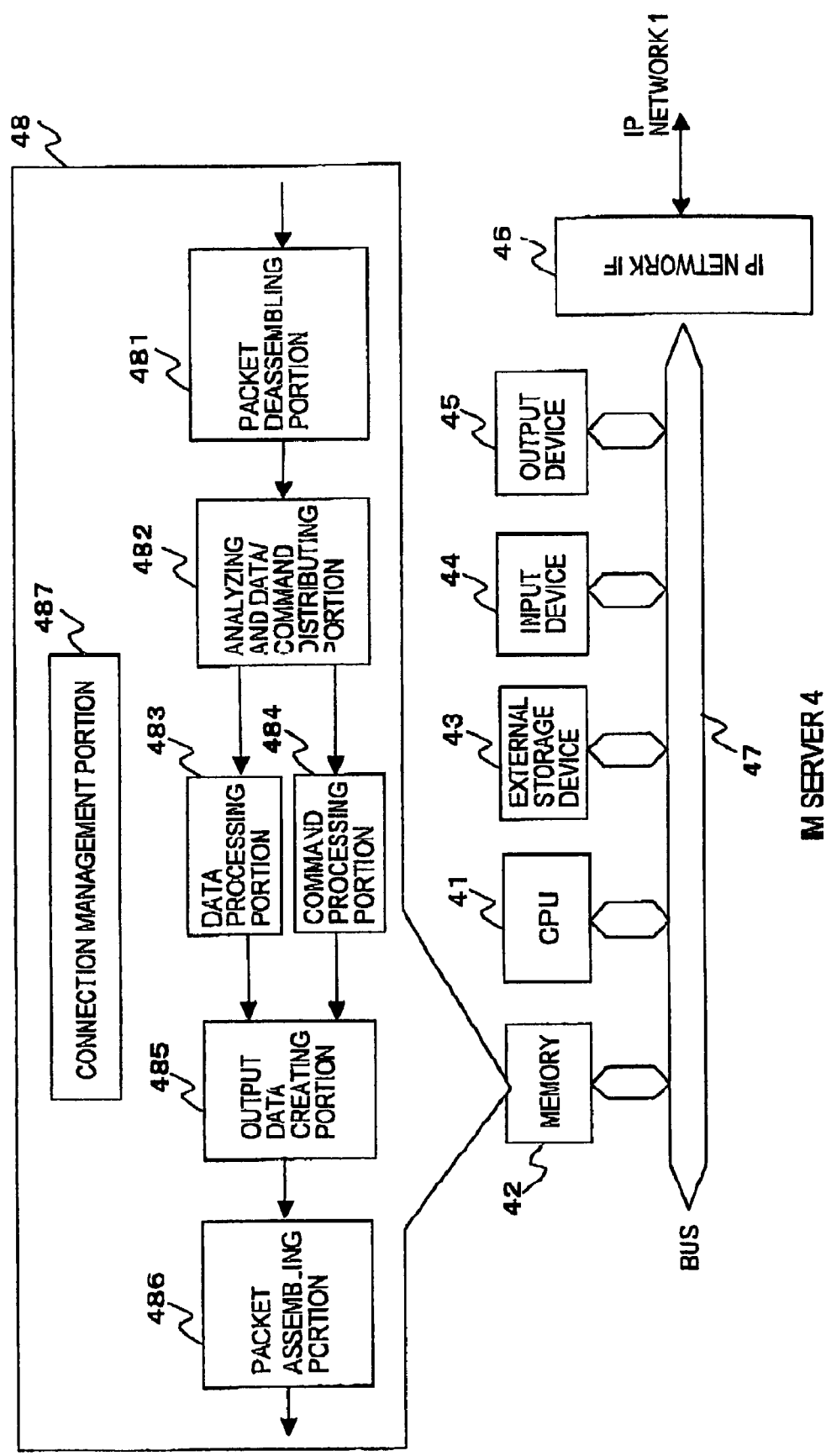
FIG. 2 is a schematic configuration diagram of an IM server 4 shown in FIG. 1.

As shown in FIG. 2, the IM server 4 is achieved by configuring functional blocks 481 to 487 shown within a balloon 48 in FIG. 2 when a CPU 41 executes a predetermined program loaded onto a memory 42 in a general-purpose computer system including the CPU 41, the memory 42, an external storage device 42, such as an HDD, an input device 44, such as a keyboard, a mouse and a pen, an output device 45, such as a speaker and a display, an IP network interface (IF) 46 which performs communication over the IP network 1, and a bus 47 for connecting these devices 41 to 46. The program for configuring the functional blocks 481 to 487 may be directly loaded from a storage medium (not shown) such as a CD-ROM, through a reading device (not shown), or from the IP network 1 to the memory 42 through the IP network IF 46. Alternatively, the program may be stored in the external memory device 43 and then may be loaded to the memory 42.

A packet deassembling portion 481 receives an IP packet addressed to itself from the IP network 1. Then, the packet deassembling portion 481 processes the IP header and the TCP/UDP header of the packet and extracts a payload.

An analyzing and data/command distributing portion 482 analyzes the content of the payload processed by the packet deassembling portion 481 and distributes the content to a data processing portion 483 as data or a command processing portion 484 as a command.

The data processing portion 483 performs processing required for IM on data distributed by the analyzing and data/command distributing portion 482. For example, for each conference, a predetermined amount of latest text data items received from each of IM clients participating in the conference is held. Then, the held text data items are merged, and then data for text chat is created therefrom.

The command processing portion 484 performs processing required for IM in accordance with the content of the command distributed by the analyzing and data/command distributed portion 482. For example, in accordance with a conference setting request command from an IM client, the command processing portion 484 performs processing required for setting a new conference. Further in accordance with a conference participating request command from an IM client, the command processing portion 484 performs processing required for calling the other IM clients to participate in the conference.

An output data creating portion 485 creates output data in accordance with results of the processing by the data processing portion 483 and/or the command processing portion 484.

A packet assembling portion 486 assembles an IP packet by adding a TCP/UDP header and an IP header to the output data created by the output data creating portion 485. The packet assembling portion 486 sends the IP packet to the IP network 1.

A connection managing portion 487 manages presence information of IM clients. In accordance with the presence information, the connection managing portion 487 controls each of the functional blocks 481 to 486 and relays between connections with the IM clients. Thus, the chat between the IM clients can be achieved.

Incidentally, the packet deassembling portion 481 and the packet assembling portion 406 may be configured for example, in hardware with a use of such as integrated logic IC within the IP network IF 46.

FIG. 3 shows an example of a presence information management table 488, which is used by the connection managing portion 487 for managing presence information. The presence information managing table 488 is stored in the external storage device 43, for example.

As shown in FIG. 3, one record 440 includes a field 431 for registering an account name of a user of an IM client, a field 432 for registering an address of the IM client, a field 433 for registering a nickname of the user of the IM client, a field 434 for registering an authentication key for using the IM-VoIP interconnecting system, a field 435 for registering presence information of the IM client, a field 436 for registering a medium (text chat and voice chat), which can be used by IM client for a chat, a field 437 for registering an address (IP address or DNS and a port number) of a conference room in which the IM client participates, a field 438 for registering a nickname of the conference room, and a field 439 for registering account names of the other IM clients with whom the IM client can chat.

Here, when a terminal in which an IM client is installed is an IP terminal, an IP address or a DNS of the terminal is registered, as an address of the IM client, in the field 432. When the terminal in which the IM client is installed is a mobile telephone and/or a fixed telephone, a telephone number and an IP address or a DNS of a VR server 10 which voice relays between the mobile telephone and/or the fixed telephone and the IP network 1 are registered therein.

Any one of information (OFF) indicating that the IM client is offline, information (idle) indicating that the IM client is online but idle, information (text) indicating that the IM client is text-chatting, information (voice) indicating that the IM client is voice-chatting, and information (text/voice) indicating that the IM client is both text chatting and voice chatting is registered in the field 435 as presence information.

An IP address assigned to the conference room is registered in the field 437 as an address of the conference room.

When a user uses a plurality of IM clients, for example, when the client terminal 7-1 is used for text-chatting and the VoIP telephone 8 is used for voice-chatting, a record 440 is registered for each of them.

The AP server 5 will be described next.

As described above, the AP server 5 manages a connection for voice chatting using VoIP. A schematic configuration of the AP server 5 is shown in FIG. 4.

As shown in FIG. 4, the AP server 5 is achieved by configuring functional blocks 581 to 585 shown within a balloon 58 in FIG. 4, when, a CPU 41 executes a predetermined program loaded onto a memory 42 in a computer system having the same hardware configuration as that of the IM server 4. The program for configuring the functional blocks 581 to 585 may be directly loaded from a storage medium (not shown) such as a CD-ROM, through a reading device (not shown), or from the IP network 1 to the memory 42 through the IP network IF 46. Alternatively, the program may be stored in an external memory device 43 and then may be loaded to the memory 42.

A packet deassembling portion 581 receives an IP packet addressed to itself from the IP network 1. Then, the packet deassembling portion 581 processes an IP header and a TCP/UDP header of the packet and extracts a payload.

An analyzing and processing portion 582 analyzes the content of the payload processed by the packet deassembling portion 581 and performs processing required for a voice chat in accordance with the content of the command stored therein. For example, in accordance with a voice chat requesting command from an IM client, processing required for calling the other parties of the conference in which the IM client participates to participate in a voice-chat is performed.

An output data creating portion 583 creates output data in accordance with a result of the processing by the analyzing and processing portion 582.

A packet assembling portion 584 assembles an IP packet by adding a TCP/UDP header and an IP header to the output data created by the output data creating portion 583. The packet creating portion 584 sends the created IP packet to the IP network 1.

A connection managing portion 585 performs connection management of a voice chat. In other words, the connection managing portion 585 controls each of the functional blocks 581 to 584 to manage a connection between an IM client and the MD server 6. Thus, voice chatting among IM clients through the MD server 6 can be achieved.

Incidentally, the packet deassembling portion 581 and the packet assembling portion 586 may be configured for example, in hardware with a use of such as integrated logic IC within the IP network IF 46.

FIG. 5 shows an example of a VoIP connection management table 586, which is used by the connection managing portion 585 for managing a voice chat. The VoIP connection managing table 586 is stored in the external storage device 43, for example.

As shown in FIG. 5, one record 540 includes a field 531 for registering an account name of a user of an IM client, a field 532 for registering an address of the IM client, a field 533 for registering a nickname of the user of the IM client, a field 534 for registering information regarding a method of encoding voice signals carried in a VoIP packet, a field 535 for registering an address (IP address or DNS and a port number called as "address for voice chat" hereinafter) of the MD server 6, which is used for a voice chat in which the IM client participate, and a field 536 for registering a nickname of the conference room.

Next, the IP terminal 7 will be described.

As described above, an IM client to be used for chatting is installed in the IM terminal 7. A schematic configuration of the IP terminal 7 is shown in FIG. 6.

Figure 6:
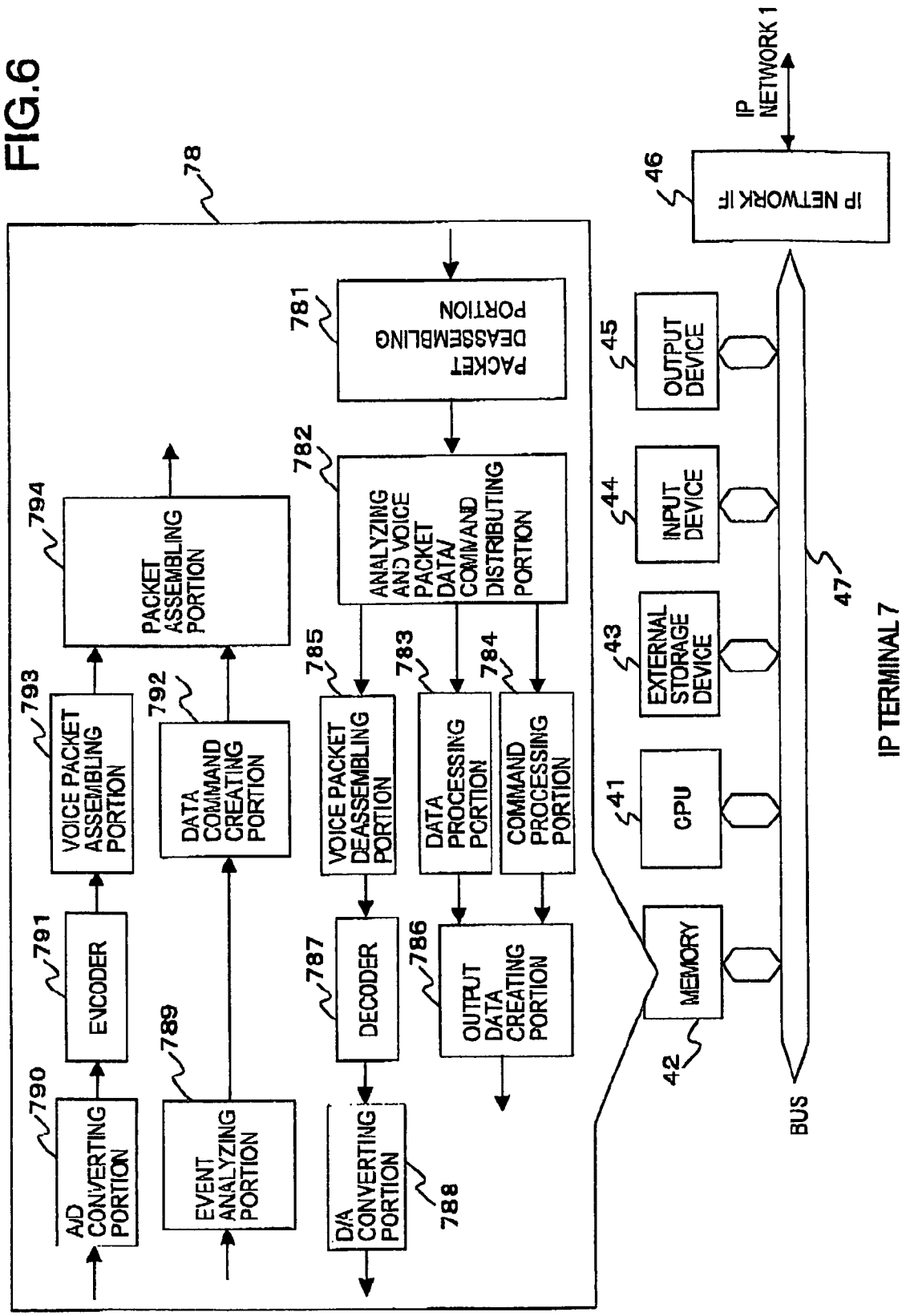
FIG. 6 is a schematic configuration diagram of an IP terminal 7 shown in FIG. 1.

As shown in FIG. 6, the IP terminal 7 is achieved by configuring functional blocks 781 to 794 shown within a balloon 78 in FIG. 6, when, a CPU 41 executes a predetermined program (IM client program) loaded onto a memory 42 in a computer system having the same hardware configuration as that of the IM server 4. The program for configuring the functional blocks 781 to 794 may be directly loaded from a storage medium (not shown) such as a CD-ROM, through a reading device (not shown), or from the IP network 1 to the memory 42 through the IP network IF 46. Alternatively, the program may be stored in the external memory device 43 and then may be loaded to the memory 42.

A packet deassembling portion 781 receives an IP packet addressed to itself from the IP network 1. Then, the packet deassembling portion 781 processes a IP header and a TCP/UDP header of the packet and extracts a payload.

An analyzing and voice packet/data/command distributing portion 782 analyzes the content of the payload processed by the packet deassembling portion 781 and distributes the content to a voice packet deassembling portion 785 as a voice packet (VoIP packet), a data processing portion 783 as data, or a command processing portion 784 as a command.

The data processing portion 783 analyzes a type of the data distributed by the analyzing and voice packet/data/command distributing portion 782 and performs processing in accordance with the type. Then, the data processing portion 783 notifies the result to an output data creating portion 786.

The command processing portion 784 analyzes the content of the command distributed by the analyzing and voice packet/data/command distributing portion 782 and performs processing in accordance with the content. Then, the command processing portion 784 notifies the result to the output data creating portion 786.

The output data creating portion 485 creates output data in accordance with results of the processing by the data processing portion 483 and the command processing portion 484. The created data is output from a display and/or speaker of the output device 45.

A voice packet deassembling portion 785 performs processing of the header of the voice packet distributed by the analyzing and voice packet/data/command distributing portion 782, thereby to extract a payload.

A decoder 787 decodes encoded voice data stored in the payload extracted by the voice packet deassembling portion 785.

A D/A converting portion 788 converts digital voice data decoded by the decoder 787 into analog voice signals. The analog voice signals are output from the speaker of the output device 45.

An A/D converting portion 790 converts analog voice signals sent from a microphone of the input device 44 to digital voice data.

An encoder 791 encodes digital voice data output from the A/D converting portion 790.

A voice packet assembling portion 793 assembles voice packets (VoIP-packets) of encoded voice data, which is output from the encoder 791.

An event analyzing portion 789 analyzes an instruction (event) input by a user through the input device 44 and sends the analysis result to a data/command creating portion 792.

A data/command creating portion 792 creates data or a command in accordance with the analysis result from the event analyzing portion 789. For example, when an event analyzed is an instruction regarding a request for starting a voice chat, a voice chat request command is created. When an event analyzed is a receipt of a message of a text chat, data representing the message is created.

A packet assembling portion 794 assembles IP packets of voice packets assembled by the voice packet assembling portion 793, IP packets of data created by the data/command creating portion 792, and IP packets of commands created by the data/command creating portion 792. And the packet assembling portion 794 sends the IP packets to the IP network 1.

Incidentally, the packet deassembling portion 781 and the packet assembling portion 794 may be configured for example, in hardware with a use of such as integrated logic IC within the IP network IF 46. The D/A converting portion 780 and the A/D converting portion 790 are configured in hardware within the output device 45 and the input device 44 (or interfaces with these devices), respectively.

FIG. 7 shows an example of a profile data 686 required for an IM client to participate in IM. The profile data 686 may be stored in the external storage device 43, for example.

As shown in FIG. 7, a nickname of a user of the IM client is registered in a tag 631. An account name, an authentication key and an address of the user of the IM client are registered in a tag 632. An address of the IM server 4 is registered in a tag 633. An address of the AP server 5 is registered in a tag 634. In this example, the profile data is in XML (eXtensible Markup Language) form. However, profile data may be in a table form or a text file form.

Basically, existing devices may be used as the VoIP telephone 8, the radio terminal 9 and the fixed telephone 11. These devices hold profile data 686 shown in FIG. 7 and use the profile data 686 to participate in IM.

When a text chat is only performed in the IP terminal 7 and a voice chat is performed by using the VoIP telephone 8, the radio terminal 9 and/or the fixed telephone 11, the IP terminal 7 does not need functional blocks (functional blocks 785, 787, 788, 790, 791 and 793) for the voice chat within a balloon 78.

Next, the MD server 6 will be described.

Figure 8:
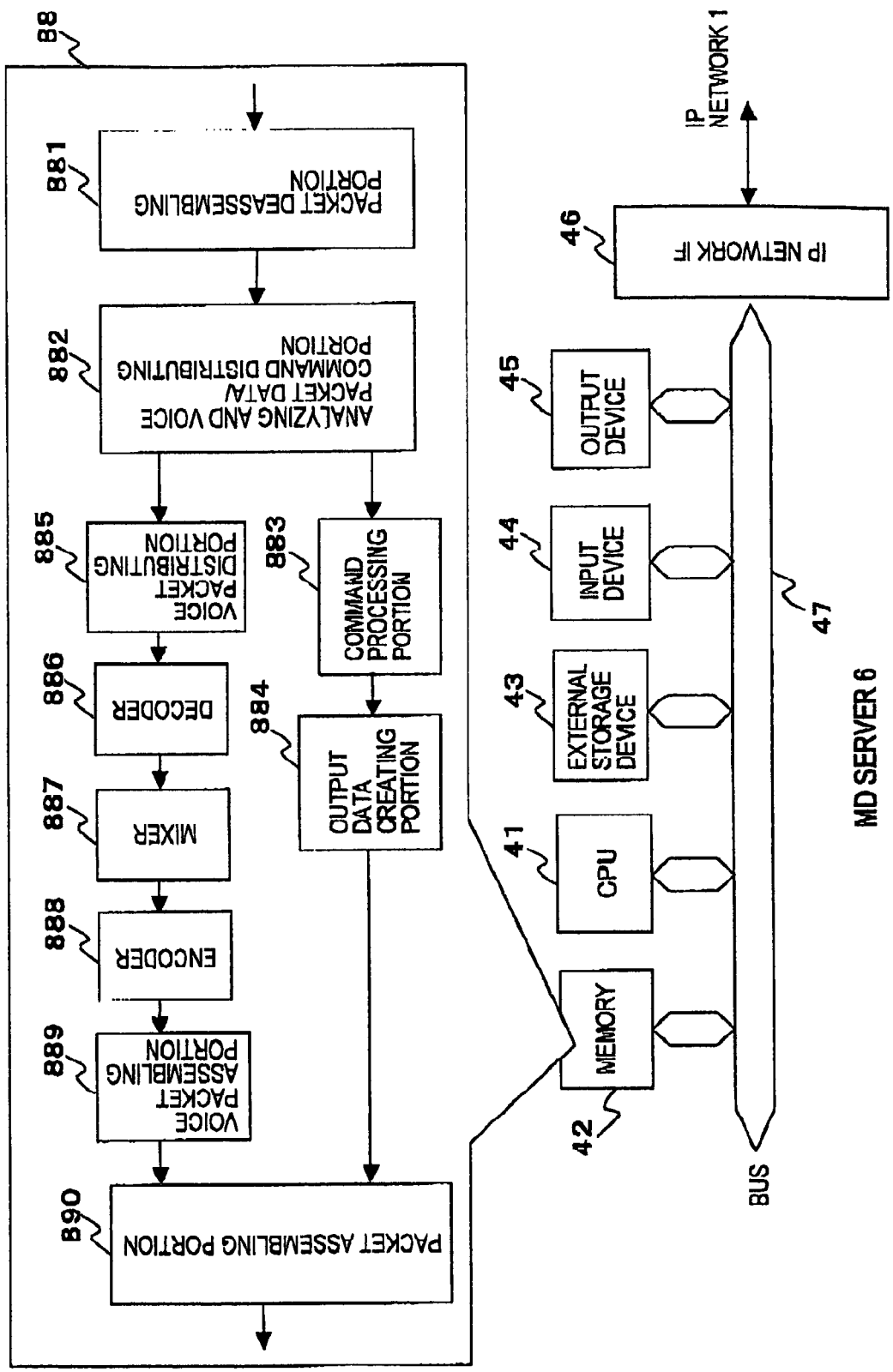
FIG. 8 is a schematic configuration diagram of an MD server 6 shown in FIG. 1.

As described above, the MD server 6 mixes voice data for multi-party voice speech (communication). FIG. 8 shows a schematic configuration of the MD server 6.

As shown in FIG. 8, the MD server 6 is achieved by configuring functional blocks 881 to 888 shown within a balloon 88 in FIG. 8, when, a CPU 41 executes a predetermined program loaded onto a memory 42 in a computer system having the same hardware configuration as that of the IM server 4. Like the case of the IM server 4, the program for configuring the functional blocks 001 to 888 may be directly loaded from a storage medium (not shown) such as a CD-ROM, through a reading device (not shown), or from the IP network 1 to the memory 42 through the IP network IF 46. Alternatively, the program may be stored in an external memory device 43 and may be loaded to the memory 42.

A packet deassembling portion 881 receives an IP packet addressed to itself from the IP network 1. Then, the packet deassembling portion 881 processes an IP header and a TCP/UDP header of the packet and extracts a payload.

An analyzing and voice packet/command distributing portion 882 analyzes the content of the payload processed by the packet deassembling portion 881 and distributes the content to a voice packet deassembling portion 885 as a voice packet (VoIP packet) or a command processing portion 883 as a command.

A command processing portion 883 analyzes the content of the command distributed by the analyzing and voice packet/command distributing portion 882 and performs processing in accordance with the content. Then, the command processing portion 784 notifies the result to an output data creating portion 884.

The output data creating portion 884 creates output data in accordance with results of the processing by the command processing portion 883.

A voice packet deassembling portion 885 processes the header of the voice packet distributed the analyzing and voice packet/command distributing portion 882 and extracts the payload.

A decoder 886 decodes encoded voice data stored in the payload extracted by the voice packet deassembling portion 785.

When one IM client (called as focused IM client) is participating in a voice chat, a mixer 887 collects from the decoder 886 and mixes (combines) encoded voice data of the other IM clients participating in the chat. Then, the composite voice data becomes composite voice data for the focused IM client. This processing is performed for each of all IM clients that are senders of the voice data, which is decoded by the decoder 886.

An encoder 888 encodes composite voice data created by the mixer 887.

A voice packet assembling portion 890 voice assembles packets (VoIP-packets) of encoded voice data, which is output from the encoder 887.

A packet assembling portion 889 assembles IP-packets of voice packets created by the voice packet assembling portion 889 and IP-packets of data created by the output data creating portion 886 and sends the IP-packets to the IP network 1.

The packet deassembling portion 881 and the packet assembling portion 890 may be configured in hardware by using an integration logic IC within the IP network IF 46, for example, Next, the VR server 10 will be described.

Figure 9:
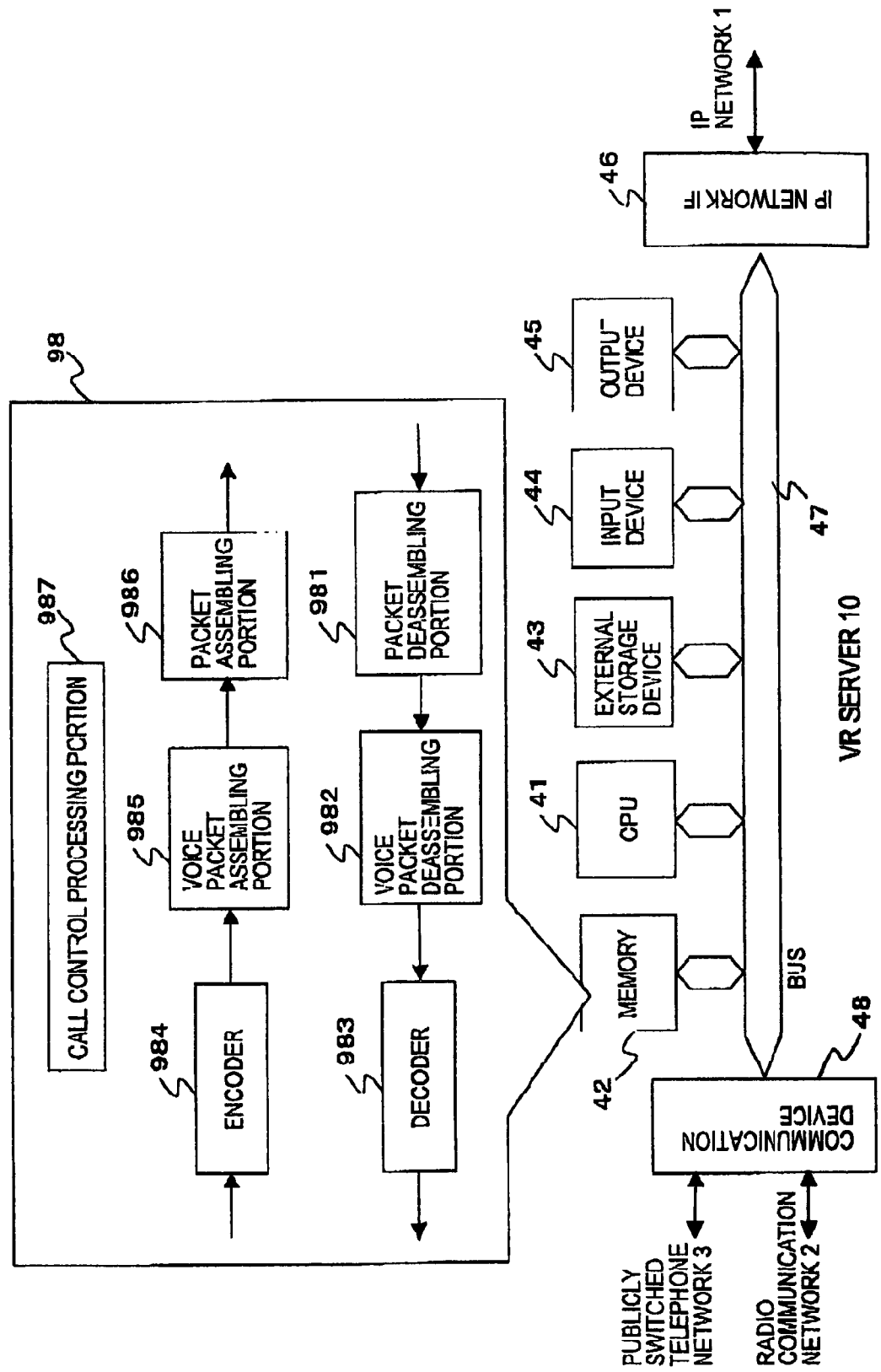
FIG. 9 is a schematic configuration diagram of a VR server 10 shown in FIG. 1.

As described above, the VR server 10 voice-relays between the radio communication network 2 and the publicly switched telephone network 3 and the IP network 1. FIG. 9 shows a schematic configuration of the VR server 10.

As shown in FIG. 9, the VR server 10 is achieved by configuring functional blocks 981 to 987 shown within a balloon 98 in FIG. 9, when, a CPU 41 executes a predetermined program loaded onto a memory 42 in a computer system having the same hardware configuration as that of the IM server 4 to which a communication device 48 for performing communication over the publicly switched telephone network 3 and/or the radio communication network 2 is added. Like the case of the IM server 4, the program for configuring the functional blocks 981 to 987 may be directly loaded from a storage medium (not shown) such as a CD-ROM, through a reading device (not shown), or from the IP network 1 to the memory 42 through the IP network IF 46. Alternatively, the program may be stored in the external memory device 43 and then may be loaded to the memory 42.

A packet deassembling portion 981 receives an IP packet addressed to itself from the IP network 1. Then, the packet deassembling portion 981 processes an IP header and the TCP/UDP header of the packet and extracts a voice packet (VoIP-packet) stored in a payload.

A voice packet deassembling portion 982 processes the header of the voice packet extracted by the packet deassembling portion 981 and extracts a payload thereof.

A decoder 983 decodes encoded voice data stored in the payload extracted by the voice packet deassembling portion 982. Then, the decoded voice data is sent to a communicating party belonging publicly switched telephone network 3 and/or the radio communication network 2 side, through the communication device 48.

An encoder 984 encodes voice data received from a communicating party belonging publicly switched telephone network 3 and/or the radio communication network 2 side, through the communication device 48.

A voice packet assembling portion 985 assembles voice packets (VoIP-packets) of encoded voice data, which is output from the encoder 984.

A packet assembling portion 986 assembles IP-packets of voice packets created by the voice packet assembling portion 985 and sends the IP packet to the IP network 1.

A call control processing portion 985 controls each of the functional blocks 981 to 986 to control and manages a call from/to a communication party (the fixed telephone 11 and/or the radio terminal 9) belonging the publicly switched telephone network 3 and/or the radio communication network 2 side. The call control processing portion 987 manages connection with the MD server 6. Thus, voice data exchanged between the MD server 6 and the fixed telephone 11 and/or the radio terminal 9 can be relayed.

The packet assembling portion 986 may be configured in hardware by using an integration logic IC within the IP network IF 46, for example.

Next, an operation of the IM-VoIP interconnecting system having the above-described configuration will be described.

First of all, a case where a switching (transition) occurs from text chatting to voice chatting will be described as a first operational example of the IM-VoIP interconnecting system according to this embodiment.

Figure 10:
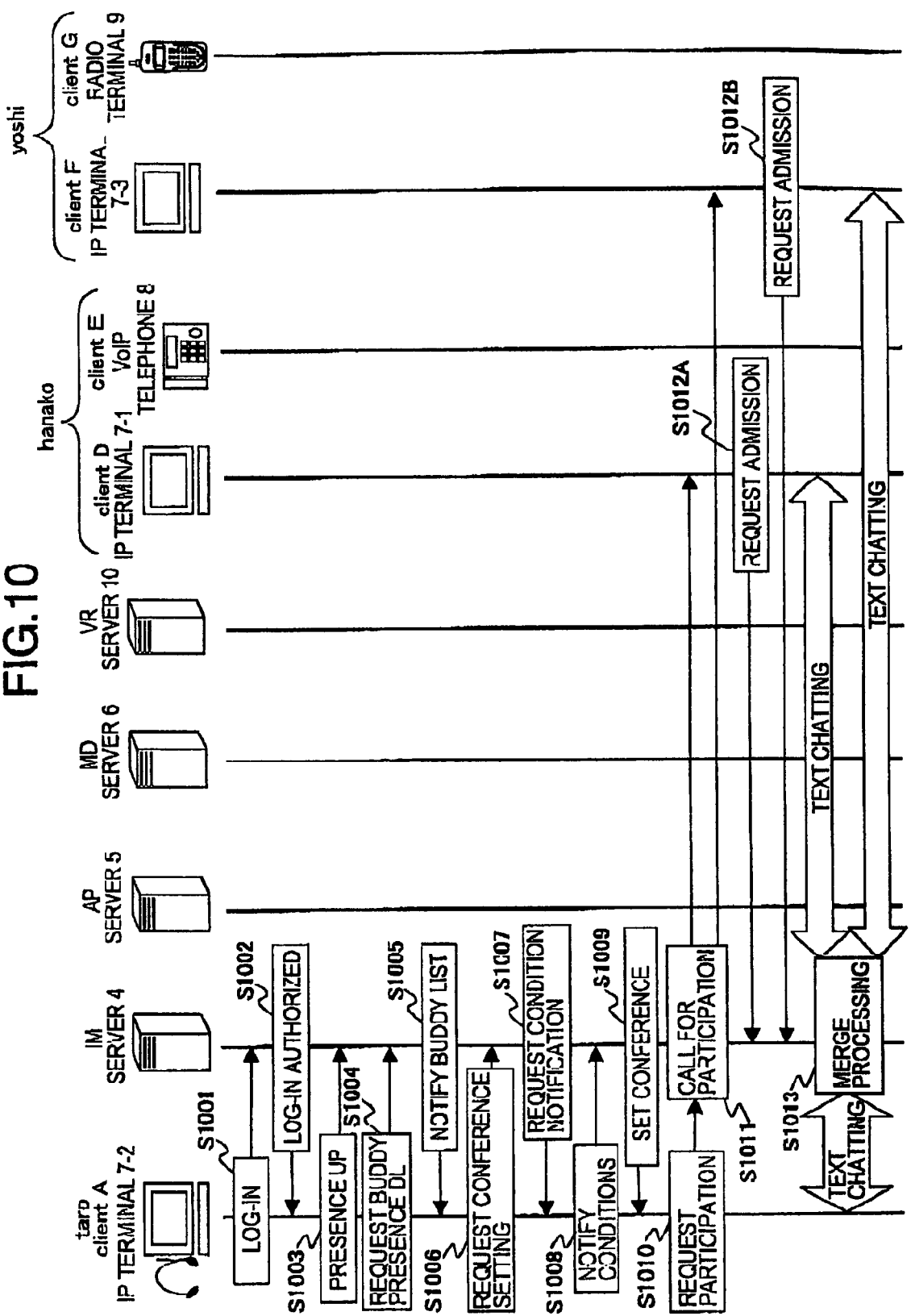
FIG. 10 is a diagram for explaining an operation for switching from a text chat to a voice chat, which is a first operational example of an IM-VoIP interconnecting system according to one embodiment of the present invention.
Figure 11:
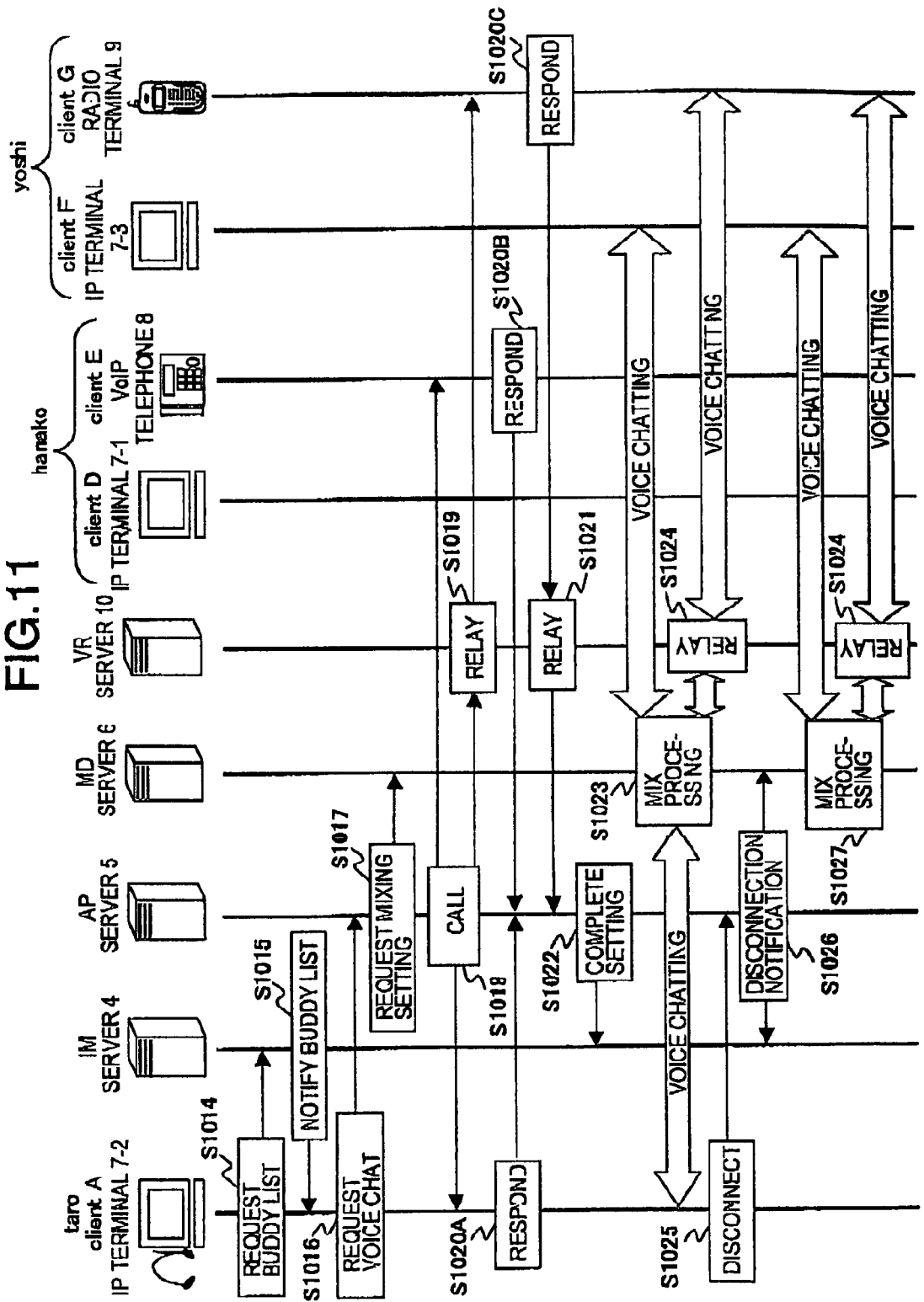
FIG. 11 is a diagram for explaining an operation for switching from a text chat to a voice chat, which is a first operational example of an IM-VoIP interconnecting system according to one embodiment of the present invention.

FIGS. 10 and 11 are diagrams for explaining an operation performed in the case where the switching occurs from text chatting to voice chatting, which is the first operational example of the IM-VoIP interconnecting system according to this embodiment.

In this example, a user having a nickname "taro" participates in IM by using the IP terminal 7-2 (account name of the IM client; client A) including both of the text chat functions and the voice chat functions (all of the functional blocks 781–794 within the balloon 78 in FIG. 6). Another user having a nickname "hanako" participates in the IM by using the IP terminal 7-1 (account name of the IM client: client D) including only the text chat functions (the functional blocks 781 to 784, 786, 789, 792 and 794 within the balloons 70 in FIG. 6) and using the VoIP telephone 0 (account name of IM client: client E). Another user having a nickname "yoshi" participates in the IM by using the IP terminal 7-3 (account name of the IM client: client F) including only the text chat functions and using the radio terminal 9 (account name of IM client: client G).

In FIGS. 10 and 11, it is assumed that the IP terminals 7-1 and 7-3, the VoIP telephone 8 and the radio terminal 9 have already logged in the IM server 4.

First of all, in the IP terminal 7-2, the event analyzing portion 789 causes, in accordance with an instruction from the user "taro", the data/command creating portion 792 to creates a log-in request command including profile data 686 stored in the own device. The log-in command is IP-packetized in the packet assembling portion 794 and is sent to the IM server 4, which is specified by an address registered in the profile data 686, over the IP network 1 (S1001).

In the IM server 4, the command processing portion 484 receives the log-in request command from the IP terminal 7-2 through the packet deassembling portion 481 and the analyzing and data/command distributing portion 482. Then, the command processing portion 484 identifies, from the presence information management table 488, the record 440 in which the same account name as the account name (client A) of an IM client registered in the profile data 686 included in the log-in request command is registered in the field 431.

Then, by checking whether or not the client nickname and the authentication key registered in the fields 433 and 434 of the specified record 440 and the client nickname and the authentication key registered in the profile data 686 are matched, whether or not the log-in is allowed is determined. If the log-in is allowed, the output data creating portion 485 is caused to create a log-in-allowed message. The log-in-allowed message is IP-packetized in the packet assembling portion 486 and is sent to the IP terminal 7-2, which is the sender of the log-in request command (S1002) through IP network 1.

In the IP terminal 7-2, the command processing portion 784 receives the log-in-allowed message from the IM server 4 through the packet deassembling portion 781 and the analyzing and voice packet/data/command distributing portion 782 and then notifies it to the event analyzing portion 789. In response to this, the event analyzing portion 789 causes, in accordance with an instruction from the user "taro", the data/command creating portion 792 to creates presence information of the IM client (such as information indicating the user can chat: "available" and information indicating that the user is busy and cannot chat; "Don't Disturb") The presence information is IP-packetized in the packet assembling portion 794 and is sent to the IM server 4, which is specified by an address registered in the profile data 686, over the IP network 1 (S1003).

In the IM server 4, the command processing portion 484 receives the presence information from the IP terminal 7-2 through the packet deassembling portion 481 and the analyzing and data/command distributing portion 482. Then, the command processing portion 484 identifies the record 440 having the account name (client A) of the IM client, which is installed in the IP terminal 7-2, and registers the received presence information in the field 435 of the record 440.

Next, in the IP terminal 7-2, the event analyzing portion 789 causes the data/command creating portion 792 to creates a command requesting to download presence information of the other chat participants. The download requesting command is IP-packetized in the packet assembling portion 794 and is sent to the IM server 4, which is specified by the address registered in the profile data 686, over the IP network 1 (S1004).

In the IM server 4, the command processing portion 484 receives the download request command from the IP terminal 7-2 through the packet deassembling portion 481 and the analyzing and data/command distributing portion 482. Then, the command processing portion 484 identifies the record 440 having the account name (client A) of the IM client, which is installed in the IP terminal 7-2. Furthermore, the command processing portion 484 obtains a buddy list registered in the field 439 of the record 440. Records 440 (records of IM clients of chat buddies) each having the account name registered in the obtained buddy list are identified from the presence information management table 488. Then, the data/command creating portion 792 is caused to create a buddy-list notification including information in the fields 431 to 433 and 435 to 438 of the identified records 440. The buddy-list notification is IP-packetized in the packet assembling portion 794 and is sent to the IP terminal 7-2, which is the sender of the download request command over the IP network 1 (S1005).

In the IP terminal 7-2, the command processing portion 784 receives the buddy list notification from the IM server 4 through the packet deassembling portion 781 and the analyzing and voice packet/data/command distributing portion 782. Then, the command processing portion 784 causes the output data creating portion 786, in accordance with information included in the buddy list notification, data indicating presence information of the chat buddies and/or usable media and/or a participated conference room. The data is notified to the user "taro" by being displayed in the display device, for example. The user "taro" can determine a chat party based on the data.

As described above, the user "taro" can recognize the presence information of the chat buddies, the usable media and/or the participated conference room based on the information included in the buddy list notification. Here, it is assumed that the user "taro" inputs an instruction to open a new conference room to the input device 44 in order to chat a topic, which is not dealt in the existing open conference room. Then, in the IP terminal 7-2, the event analysis portion 789 detects the instruction and causes the data/command creating portion 792 to create a request command for setting a conference room. The setting request command is IP-packetized in the packet assembling portion 794 and is sent to the IM server 4, which is specified by the address registered in the profile data 686, over the IP network 1 (S1006).

In the IM server 4, the command processing portion 484 receives the request command for setting the conference room from the IP terminal 7-2 through the packet deassembling portion 481 and the analyzing and data/command distributing portion 482. Then, the command processing portion 484 assigns an arbitrary address selected from addresses held by the command processing portion 484 to the conference room to be opened newly. Then, The data/command creating portion 485 is caused to create setting request commands for setting conditions required for opening the conference room, such as a nickname and enter/exist limitations for the conference room to be opened newly.

The setting request command is IP-packetized in the packet assembling portion 486 and is sent to the IP terminal 7-2, which is the sender of the request command for setting the conference room, over the IP networks 1 (S1007).

In the IP terminal 7-2, the command processing portion 784 receives the setting request commands for setting conditions required for opening the conference room from the IM server 4 through the packet deassembling portion 781 and the analyzing and voice packet/data/command distributing portion 782. Then, the command processing portion causes the output data creating portion 786 to display an input screen data for receiving conditions required for opening the conference room in the display device, whereby the user "taro" can input the conditions. When the event analyzing portion 789 receives the input of the conditions from the user "taro", the event analyzing portion 789 causes the data/command creating portion 792 to create setting data including the conditions received from the user "taro". The setting data is IP-packetized in the packet assembling portion 794 and is sent to the IM server 4, which is specified by the address registered in the profile data 686, over the IP network 1 (S1008).

In the IM server 4, the command processing portion 484 receives setting data for the conditions required for opening the conference room from the IP terminal 7-2 through the packet deassembling portion 481 and the analyzing and data/command distributing portion 482. Then, the command processing portion 484 opens the conference room by using the setting data and the address assigned for the conference room at the S1007. Then, the record 440 having the account name (client A) of the IM client of the IP terminal 7-2, which is the sender or the setting data, is identified from the presence information managing table 488. The address and the nickname of the conference room are registered in the fields 437 and 438 of the specified record 440 (S1009). Additionally, the presence information indicating that text chatting is in progress is registered in the field 435 of the specified record 440. The command processing portion 484 causes the output data creating portion 485 to create an opening completion message including the address and the nickname of the conference room. The opening completion message is IP-packetized in the packet assembling portion 486 and is sent to the IP terminal 7-2, which is the sender of the setting data, over the IP network 1.

In the IP terminal 7-2, the command processing portion 784 receives the opening completion message for the conference room from the IM server 4 through the packet deassembling portion 781 and the analyzing and voice packet/data/command distributing portion 782. Then, the command processing portion 784 causes the output data creating portion 786 to display data of the address and the nickname of the conference room, which is included in the opening completion message, in the display device, whereby the content of the opened conference room is notified to the user "taro". Thus, the user "taro" can determine a chat buddy to be invited to the conference room opened by the user "taro" with reference to the presence information of the chat buddies displayed in the display device, for example, of the IP terminal 7-2.

In the IP terminal 7-2, the event analyzing portion 789 receives a specification of an account name of the chat buddy to be invited to the conference room by the user "taro". Then, the event analyzing portion 789 causes the data/command creating portion 792 to create a conference participation requesting command including the specification and the address or the nickname of the conference room. The participation requesting command is IP-packetized in the packet assembling portion 794 and is sent to the IM server 4, specified by the address registered in the profile data 686, over the IP network 1 (S1010).

In the IM server 4, the command processing portion 484 receives the conference participation requesting command from the IP terminal 7-2 through the packet deassembling portion 481 and the analyzing and data/command distributing portion 482. Then, the command processing portion 484 identifies records 440 having the account names included in the participation requesting command from the presence information management table 488, and checks whether or not each of the IM clients in the specified records 440 can participate in the text chat with reference to the presence information and the usable media registered in the field 435 and the 436 of the specified records 440. Then, the command processing portion 484 obtains an address registered in each of the fields 432 of the records 440 of the IM clients, which are determined as being able to participate therein.

Next, the command processing portion 484 causes the output data creating portion 485 to create, for each IM client determined as being able to participate therein, a participation inviting command including the address and the nickname of the conference room and the nickname "taro" of the IM client, who is inviting the participation. The participation inviting command created for each IM client determined as being able to participate is IP-packetized in the packet assembling portion 486 and is sent to each of the addresses of the destination IM clients via the IP network 1 (S1011). Here, the participation inviting command is sent to the IM terminal 7-1 (account name of the IM client: client D) and the IM terminal 7-3 (account name of the IM client: client F).

In the IP terminal 7-1, the command processing portion 784 receives the participation inviting command from the IM server 4 through the packet deassembling portion 781 and the analyzing and voice packet/data/command distributing portion 782. Then, the command processing portion 784 causes the output data creating portion 786 to display data of the address and/or the nickname of the conference room and the nickname "taro" of the IM client who is inviting the participation, which are included in the participation inviting command in the display device. Whereby, the participation invitation from the user "taro" is notified to the user "hanako" of the IP terminal 7-1. Thus, the user "hanako" can determines whether or not she will respond to the participation invitation from the user "taro". The same processing is performed in the IP terminal 7-3, too. Thus, the user "yoshi" can determine whether or not he will respond to the participation invitation to the user "taro".

In the IP terminal 7-1, when the event analyzing portion 789 receives the instruction indicating the user "hanako" will respond to the participation invitation, the event analyzing portion 789 causes the data command creating portion 792 to create an admission request command including the address and/or the nickname of the conference room. The admission request command is IP-packetized in the packet assembling portion 794 and is sent to the IM server 4, which is the sender of the participation inviting command, over the IP network 1 (S1012A). The same processing is performed in the IP terminal 7-3, too. Thus, the admission request command is sent from the IP terminal 7-3 to the IM server 4 (S1012B).

In the IM server 4, the command processing portion 484 receives the admission request command from the IP terminal 7-1 through the packet deassembling portion 481 and the analyzing and data/command distributing portion 482. The command processing portion 484 identifies the record 440 having the account name (client D) of the IM client installed in the IP terminal 7-1 from the presence information management table 488. Then, the address and the nickname of the conference room included in the admission request command are registered in the fields 437 and 438 of the specified record 440. In addition, the presence information indicating the text chat is in progress is registered in the field 435 of the specified record 440. Furthermore, the command processing portion 484 specifies the address of the conference room to the connection managing portion 487 and requests connection management.

In response to this, the connection managing portion 487 totally controls the functional blocks 481 to 486 within the balloon 48 of FIG. 2 to manage connection between the address of the conference room specified by the command processing portion 484, that is, the IM server 4, and the IP terminals 7 corresponding to the records 440 of the presence information management table 488 in which the conference room address are registered.

The connection managing portion 487 notifies the account names and the addresses of the IM clients registered in the records 440, respectively, to the data processing portion 483. Then, the text chatting among IP terminals 7 corresponding to the records 440 are performed (S1013).

More specifically, the data processing portion 483 holds text data received from the IP terminals participating in the text chat by a predetermined amount from the latest one. In addition, the data processing portion 483 merges the held text data to create data for the text chat. The data for the text chat is IP-packetized in the packet assembling portion 486 and is sent to the IP terminals 7 participating in the text chat.

Here, each of the IP terminals 7 undergoes following processing: When a message is input by a user, the event analyzing portion 789 causes the data/command creating portion 792 to create text data corresponding to the message data. The text data is IP-packetized in the packet assembling portion 794 and is sent to the IM server 4. On the other hand, the data processing portion 783 receives the data for the text chat from the IM server 4 through the packet deassembling portion 781 and the analyzing and voice packet/data/command distributing portion 782. Then, the data processing portion 783 processes the data for the text chat and causes the display device to display the data.

In the IP terminal 7-2, the event analyzing portion 789 receives an instruction for requesting information regarding chat buddies from the user "taro" during the text chatting. Then, the event analyzing portion 789 causes the data/command creating portion 792 to create a buddy list requesting command including the account name of the IM client of the user "taro". The request command is IP-packetized in the packet assembling portion 794 and is sent to the IM server 4 through the IP network 1.

In the IM server 4, the command processing portion 484 receives the buddy list request command from the IP terminal 7-2 through the packet deassembling portion 481 and the analyzing and data/command distributing portion 482. Then, the command processing portion 484 identifies, from the presence information management table 488, the record 440 having the account name included in the request command registered in the field 431. Then, each of the record 440 having the account name registered in the field 431, which is written in the buddy list registered in the field 439 of the record 440, is identified from the presence information management table 488.

Then, the command processing portion 484 causes the output data creating portion 485 to create a buddy list in which information regarding each of the chat buddies is registered including various information (except for the authentication key at least) registered in each of the identified records 440. The buddy list is IP-packetized in the packet assembling portion 486 and is sent to the IP terminal 7-2, which is the sender of the buddy list request, over the IP network 1 (S1015).

In the IP terminal 7-2, the command processing portion 784 receives the buddy list from the IM server 4 through the packet deassembling portion 781 and the analyzing and voice packet/data/command distributing portion 782. Then, the command processing portion 784 causes the output data creating portion 786 to display data for information written in the buddy list in the display device, whereby, the information on the chat buddies is notified to the user "taro". Thus, the user "taro" can check, through the text chat he is executing, whether or not the buddy participating in the conference room can voice-chat, and, if so, which IM client (which can be identified from the account name and the client nickname) is used for the voice chat.

Now, it is assumed that, the user "taro" determines, from the information on the buddy list displayed in the display device and by exchanging messages through text chatting, that the users "hanako" and "yoshi" participating in the conference can participate in voice chatting by using IM client (the VoIP telephone 8 and the radio terminal 9) having the account names "client E" and "client C", respectively. In addition, it is assumed that the user "taro" determines that each of the users "hanako" and "yoshi" has an intention to participate in voice chatting. Then, it is assumed that an instruction for requesting to voice-chat with the IM clients whose account names are "client E" and the "client G", respectively, is input to the input device 44.

In the IP terminal 7-2, in accordance with the instruction for requesting voice chatting from the user "taro", the event analyzing portion 789 causes the data/command creating portion 792 to create a voice chatting request command including various informations (such as the account names, the client addresses and the client nicknames) of the IM client of the user "taro" and the IM clients to be invited the chat, and the address and the nickname of the participating conference room. The voice chatting request command is IP-packetized in the packet assembling portion 794 and is sent to the AP server 5, which is identified by the address registered in the profile data 686, over the IP network 1 (S1016).

In the AP server 5, the analysis processing portion 582 receives the voice chatting request command through the packet deassembling portion 581. Then, the analysis processing portion 582 causes the output data creating portion 583 to create a mixing setting request command including an address of each of the IM clients included in the voice chat request command (an address of the VR server 10 where the IM client is the radio terminal 9 or the fixed telephone 11), an address assigned to the MD server 6 for the voice chatting (an address for voice chatting) and a method for encoding voice signals (an encoding method, which can be adopted in common by the IM clients (when one of the clients is the radio terminal 9 or the fixed telephone 11, the VR server 10 is replaced instead of the one) participating in the voice chatting, this information may be registered in advance in each of the records 440 in the presence information management table 488). The mixing setting request command is IP-packetized in the packet assembling portion 584 and is sent to the MD server 6 over the IP network 1 (S1017).

In the MD server 6, the command processing portion 883 receives the mixing setting request command through the packet deassembling portion 881 and the analyzing and voice packet/command distributing portion 882. Then, in accordance with the information included in the setting request command, the command processing portion 883 sets the voice packet deassembling portion 885, the decoder 886, the mixer 887 and the voice packet assembling portion 889 such that voice chatting can be performed among the IM clients.

On the other hand, in the AP server 5, the analyzing processing portion 582 causes the output data creating portion 583 to create a voice chatting calling command for each of the IM clients identified by the addresses included in the voice chatting request command received from the IP terminal 7-2. The voice chatting calling command includes an address for voice chatting. The voice chatting calling command is IP-packetized in the packet assembling portion 584 and is sent to each of the IM clients, which are identified by the address included in the voice chatting request command, over the IP network 1 (S1018).

Here, when the destination IM client is installed in the radio terminal 9 and the fixed telephone 11, the voice chat calling command further includes a telephone number registered in the field 432 of the record 440 in the presence information management table 488 for the IM client and so on, in addition to the address for voice chatting. Then, the voice chatting calling command is sent to the VR server 10 identified by the IP address registered in the field 432. In the VR server 10, when the call control processing portion 987 receives the voice chatting calling command from the AP server 5, the call control processing portion 987 calls to the radio terminal 9 identified by the telephone number, for example, included in the calling command by using a telephone (S1019).

In this way, each of the IM clients specified by the voice chatting request is called out by the AP server 5. In the IP terminal 7-2, the call command reaches to the command processing portion 784 through the packet deassembling portion 781 and the analyzing and voice packet/data/command distributing portion 782. The command processing portion 784 notifies the user "taro" that he is called by, for example, output calling tone data created by the output data creating portion 786 and outputted from the speaker. Then, in accordance with an instruction from the user "taro", the event analyzing portion 789 causes the data/command creating portion 792 to create a response message to the call command. The response message is IP-packetized by the packet assembling portion 794 and is sent to the AP server 5 (S1020A). Similarly, the response messages to calls are created in the VoIP telephone 8 and the radio terminal 9 and are sent to the AP server 5 (S1020B and S1020C). Here, the response message from the radio terminal 9 is relayed to the AP server 5 by the call control processing portion 987 of the VR server 10 (S1021).

In the AP server 5, the analyzing and processing portion 582 receives the response message through the packet analyzing portion 581. Then, the analyzing and processing portion 582 notifies, to the connection managing portion 585, information (information included in the voice chat request command) of the IM client having sent the response message, the nickname of the conference room in which the text chatting is being performed, and the address for voice chatting assigned to the MD server 6. In response to this, the connection managing portion 585 adds a new record 540 to the connection managing table 586 and registers these kinds of information in the record 540. When the analyzing and processing portion 582 receives the response message from all of the IM clients having sent the call command, the analyzing and processing portion 582 causes the output data creating portion 583 to create a setting completion command including information on these IM clients and the address for the voice chatting assigned to the MD server 6. The setting completion command is IP-packetized in the packet assembling portion 584 and is notified to the IM server 4 over the IP network 1 (S1022).

In the IM server 4, the command processing portion 484 receives the setting completion command through the packet deassembling portion 481 and the analyzing and data/command distributing portion 482. Then, the command processing portion 484 notifies the connection managing portion 487 of the information of the IM clients included in the setting completion command and the address for the voice chatting. The connection managing portion 487 identifies the records 440 that correspond to the respective IM clients, which have received from the command processing portion 484, from the presence information management table 488. Then, the presence information indicating that the voice chatting is in progress is registered in the field 435 of each of the identified records 440. In addition, the address for the voice chatting is registered in the field 437. Furthermore, the nickname of the conference room in which text chatting is held is registered in the field 437.

Once these kinds of processing have completed, a connection for the voice chatting is established between the MD server 6 and each of the IM clients (IP terminal 7-2, the VoIP telephone 8 and the radio terminal 9). In the MD server 6, the mixing processing is then performed. Voice data from each of the IM clients participating in the voice chatting is synthesized and is distributed to each of the IM clients (S1023).

More specifically, the voice packet sent from each of the IM clients to the address for voice chatting is input to the voice packet deassembling portion 885 through the packet deassembling portion 881 and the analyzing and voice packet/command distributing portion 882 and undergoes header processing. Thus, the encoded voice data is obtained. Next, the encoded voice data is decoded by the decoder 886 and is input to the mixer 887. The mixer 887 buffers voice data for each of the IM clients for a predetermined period of time with respect to the voice packet sent to the same voice chatting address. The mixer 887 synthesizes voice data buffered for each of the IM clients participating in the voice chatting, except for the focused IM client which is destination of the synthesized data. The mixer 887 performs above synthesizing process for each of the IM clients participating in the voice chatting as the focused IM client. The synthesized voice data created as such is encoded by the encoder 888 and is voice packetized (VoIP-packetized) in the voice packet assembling portion 880. Then, the voice packet is IP-packetized in the packet assembling portion 890 and is sent to the focused IM client with respect to the synthesized voice data.

Here, in the IP terminal 7-2, the following processing is performed; An analog voice signal representing voice input from the user is converted to a digital voice signal in the A/D converting portion 790 and is encoded in the encoder 791. Then, the encoded voice data is voice-packetized in the voice packet assembling portion 793. Furthermore, the voice-packetized data is IP-packetized in the packet assembling portion 794 and is sent to the voice chatting address of the MD server 6. On the other hand, the voice packet deassembling portion 785 performs header processing on the voice packet received from the MD server 6 through the packet deassembling portion 781 and the analyzing and voice packet/data/command distributing portion 782. Thus, the encoded voice data is obtained. Next, the encoded voice data is decoded by the decoder 787 and is converted to an analog voice signal in the D/A converting portion 788 to be output from the speaker.

The same processing as that in the IP terminal 7-2 is performed in the VoIP telephone 0. On the other hand, in the VR server 10, converting processing is performed between an IP packet storing the voice packet and a voice signal in a signal format adopted by the radio communication network 2 (S1024). Thus, the radio terminal 9 may be an existing radio terminal such as a mobile telephone.

Now, in the IP terminal 7-2, the event analyzing portion 789 receives a voice chatting closing instruction from the user "taro". Then, the event analyzing portion 789 causes the data/command creating portion 792 to create a voice disconnection request command including the information (such as account name and/or address) of the IM client of the user "taro". The voice disconnection request command is IP-packetized in the packet assembling portion 794 and is sent to the AP server 5, which is identified by the address registered in the profile data 686 (S1025).

In the AP server 5, the analyzing and processing portion 582 receives the voice disconnection request command through the packet analyzing portion 581 and transfers the command to the IM server 4 and the MD server 6 through the packet assembling portion 584 (S1026).

In the IM server 4, the command processing portion 484 receives the voice disconnection request command through the packet deassembling portion 481 and the analyzing and data/command distributing portion 482. Then, the command processing portion 484 notifies the receipt to the connection managing portion 487. The connection managing portion 487 identifies, from the presence information management table 488, a record 440 having information (the account name and/or the client address) of the IM client included in the voice disconnection request command. Then information (presence information indicating that the voice chatting is in progress registered in the field 435 and/or the voice chatting address registered in the field 437) relating to the voice chatting registered in the identified record 440 is deleted. As a result, when the corresponding IM client is not chatting, information indicating the idle status is registered in the field 435. In addition, the conference nickname registered in the field 438 is deleted.

In the MD server 6, the command processing portion 883 receives the voice disconnection request command through the packet deassembling portion 881 and the analyzing and voice packet/command distributing portion 882. Then, the command processing portion 883b controls the mixer 887 to stop processing for buffering voice data for a IM client included in the voice disconnection request command and for creating synthesized voice data for the IM client as the focused IM client. As a result, voice chatting is performed only between the VoIP telephone 8 and the radio terminal 9 (S1027). When the VoIP telephone 8 and the radio terminal 9 finishes the voice chatting, the same processing as that for the IP terminal 7-2 is also performed. When all of the IM clients finish the voice chatting, the address assigned to the voice chatting is removed from the connection management table 586 and the address is released.

Figure 12:
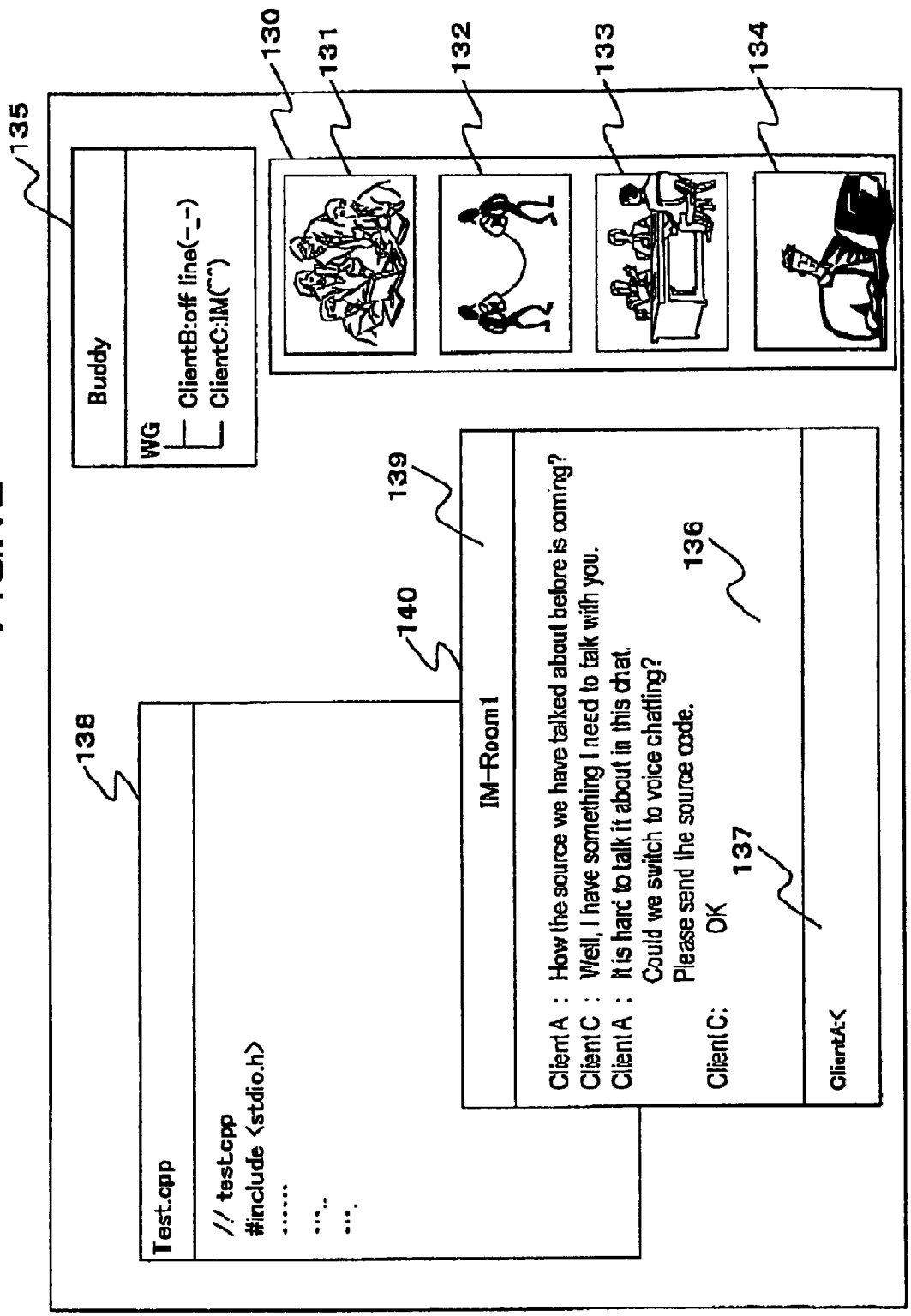
FIG. 12 is a diagram showing an example of a user interface of an IM client, which is displayed in an IP terminal 7.

FIG. 12 shows an example of a user interface of an IM client, which is displayed in the IP terminal 7.

A reference numeral 130 indicates a main menu bar 130 of the IM client. The main menu bar 130 includes an icon 131 indicating an operation relating to presence information, an icon 132 indicating voice chatting in one-to one (Peer-to-Peer), an icon 133 indicating voice chatting in multi-party communication and an icon 134 indicating text chatting.

When a user selects the icon 131 by using an input device 44, the user is prompted to select to set the presence information of the IM client of the user or to obtain/display presence information of the other buddies' presence information. Then, when obtaining/displaying the presence information of the other buddies' IM clients is selected, the steps S1004 and S1005 in FIG. 10 are performed if chatting by the other buddies' IM clients is not in progress. Then, for example, the presence information of the other buddies registered in the buddy list is displayed within the display area 135. On the other hand, if the chatting by the other buddies' IM clients is in progress, the steps S1014 and S1015 in FIG. 11 are performed. Then, for example, the presence information of the chatting biddies is displayed within the display area 135.

A reference numeral 138 indicates a display area displaying a content of a file transferred from the buddy's IM client.

A reference numeral 140 indicates a display area for text chatting. The display area 140 includes an area 139 for displaying a nickname of a conference room and an area 136 for displaying a content of a text chat, and an area 137 displaying a text message received from the user. The display area 140 is displayed when the user selects the icon 134 by using the input device 44.

Next, a variation example of the first operational example will be described.

Figure 13:
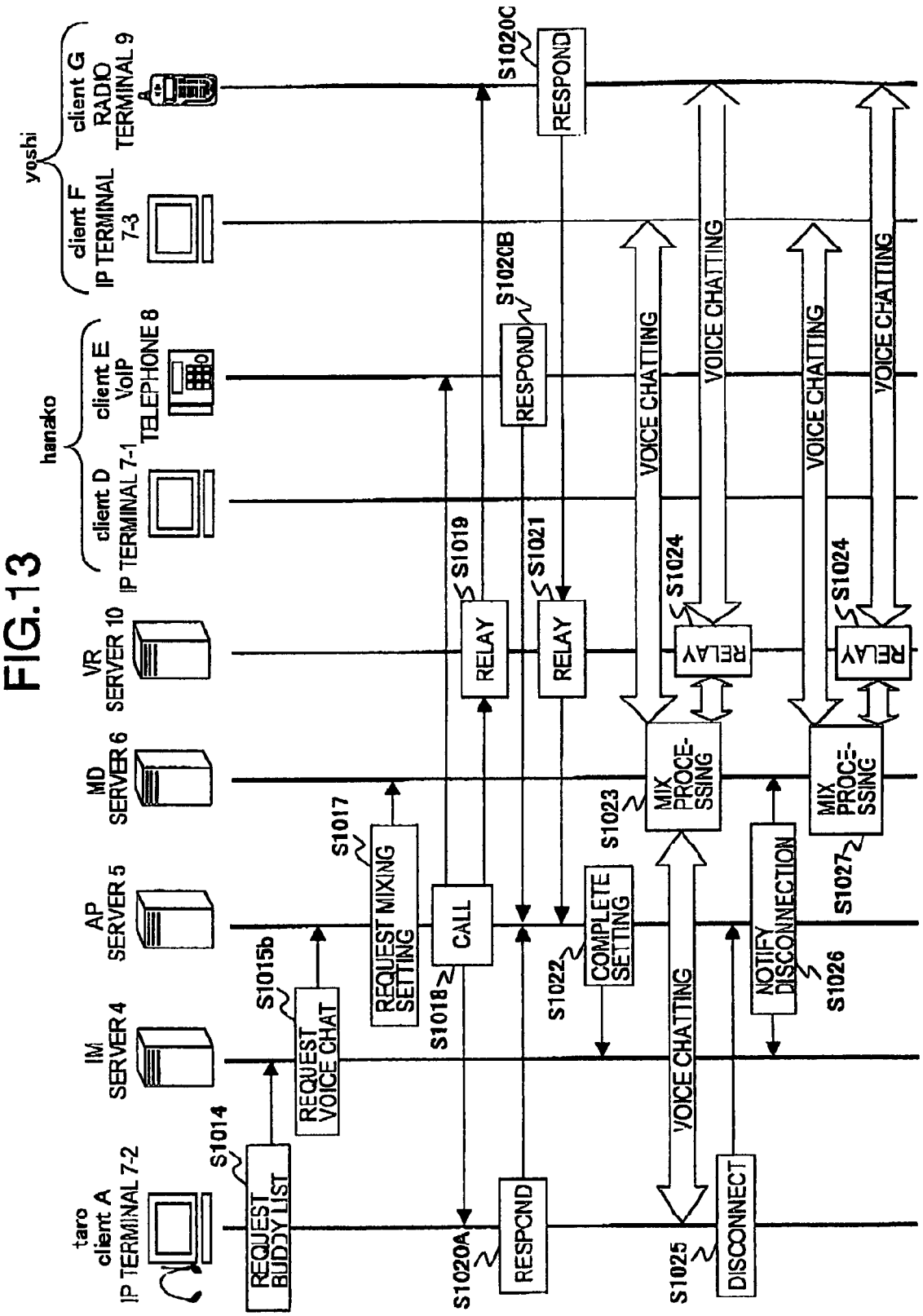
FIG. 13 is a diagram for explaining a variation example of the first operational example shown in FIG. 11.

FIG. 13 is a diagram for explaining a variation example of the first operational example and for explaining an operation of the part corresponding to FIG. 11. The operation of the part corresponding to FIG. 10 is the same as that of the first operational example.

In the first embodiment, as shown in FIG. 11, the IM server 4 receives a buddy list request command from the IP terminal 7-2 (S1014). Then, a buddy list including presence information of text-chatting buddies is created. Then, this is notified to the IP terminal 7-2 (S1015). Then, In the IP terminal 7-2, a voice chatting request command including information of IM clients for voice chatting is created and is sent to the AP server 5 (S1016).

On the other hand, in this variation example, as shown in FIG. 13, when the IM server 4 receives a buddy list request command from the IP terminal 7-2 (S1014), IM clients of buddies who can perform voice chatting are identified, instead of the user of the IP terminal 7-2, by using the presence information of the text-chatting buddies and the presence management information table 488. Then, the voice chat request command including information of the IM clients are sent to the AP server 5 (S1015b). The other steps are the same as those in FIG. 11.

Here, the IM clients of the buddies who can perform voice-chatting may be identified as follows: First of all, for each of the IM clients of text chatting buddies, it is checked whether or not voice chatting is included in usable media registered in the field 436 of the corresponding record 440 in the presence management information table 488. If voice chatting is included in the usable media, the IM client is set as the buddy IM client which can perform voice chatting. On the other hand, if the voice chatting is not included in the usable media, it is checked whether or not a record 440 having the same nickname as the IM client exists among the records 440 having the account name written in the buddy list registered in the field 439 of the record 440. If so, the presence information indicating the idle state is registered in the field 435 of the record 440. Then, furthermore, it is checked whether or not voice chatting is included in the usable media registered in the field 436. Then, IM clients corresponding to the record 440 satisfying these conditions are set as the buddy IM client who can perform voice chatting.

Next, another variation example of the first operational example will be described.

Figure 14:
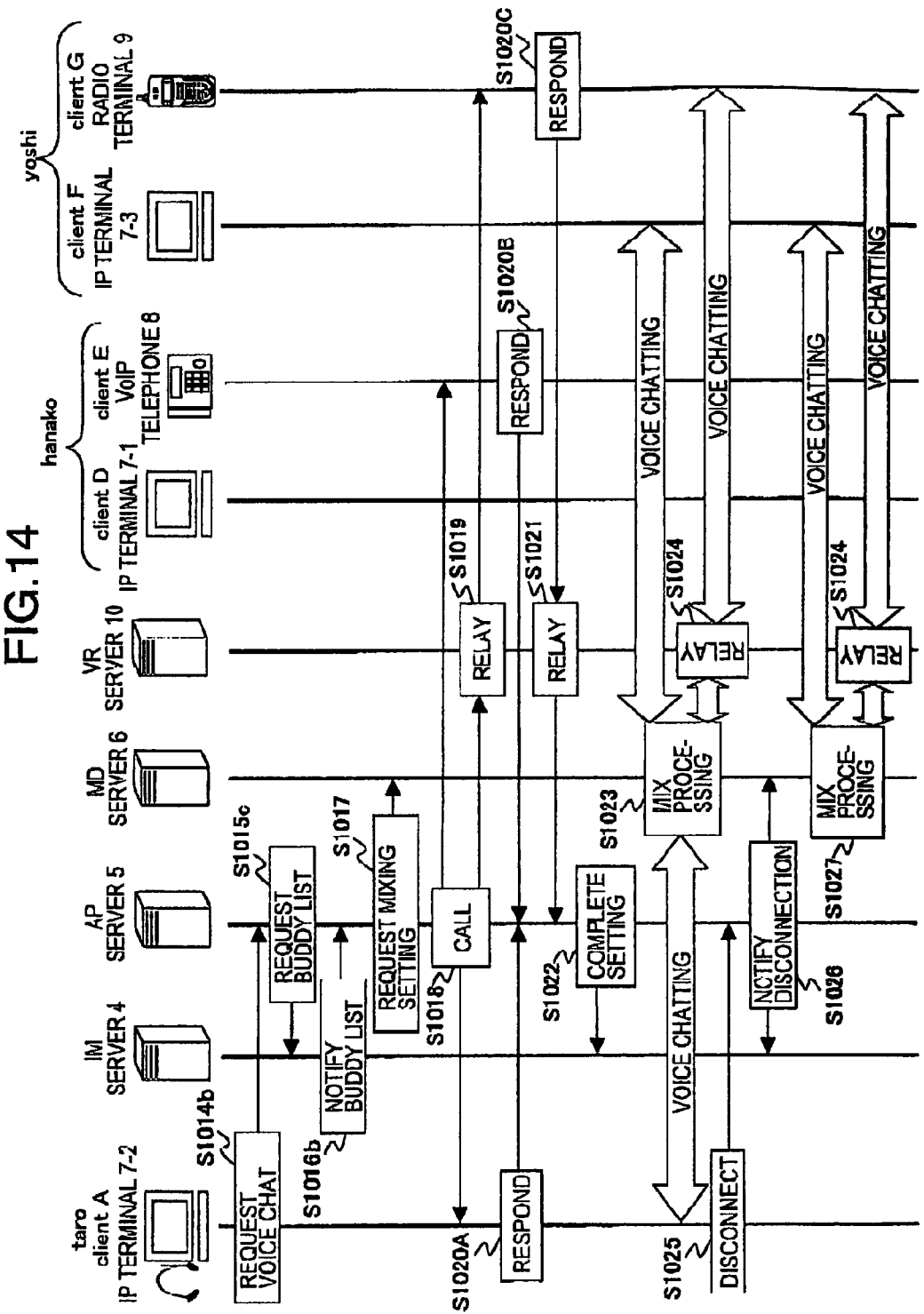
FIG. 14 is a diagram for explaining a variation example of the first operational example shown in FIG. 11.

FIG. 14 is a diagram for explaining another variation example of the first operational example which explains an operation of the part corresponding to FIG. 11. The operation of the part corresponding to FIG. 10 is the same as that of the first operational example.

In the first embodiment, as shown in FIG. 11, the IP terminal 7-2 sends a buddy list request command to the IM server 4 from (S1014) Then, the IP terminal 7-2 receives a buddy list including presence information of text-chatting buddies from IM server (S1015). Then, in the IP terminal 7-2, a voice chatting request command including information of IM clients for voice chatting is created and is sent to the AP server 5 (S1016).

On the other hand, in this variation example, as shown in FIG. 14, the IP terminal 7-2 directly sends to the AP server 5 a voice chat request command including the information of the IM clients of the IP terminal 7-2 and the information of the conference room (S1014b), Then, the AP server 5 creates a buddy list request command including the information of the IM client of the IP terminal 7-2 and the information of the conference room and sends the buddy list request command to the IM server 4 (S1015c). The IM server 4 receives the buddy list request command from the AP server 5. Then, the IM server 4 uses the presence information of the text chatting buddies and the presence management information table 488 to identify IM clients, which are buddies of the IM client of the IP terminal 7-2 and can perform voice chatting. Then, the information is sent to the AP server 5 as a buddy list (S1016b). The other steps are the same as those in FIG. 11.

Next, a case where text chatting is also used during voice chatting will be described as a second operational example of the IM-VoIP interconnecting system according to this embodiment.

Figure 15:
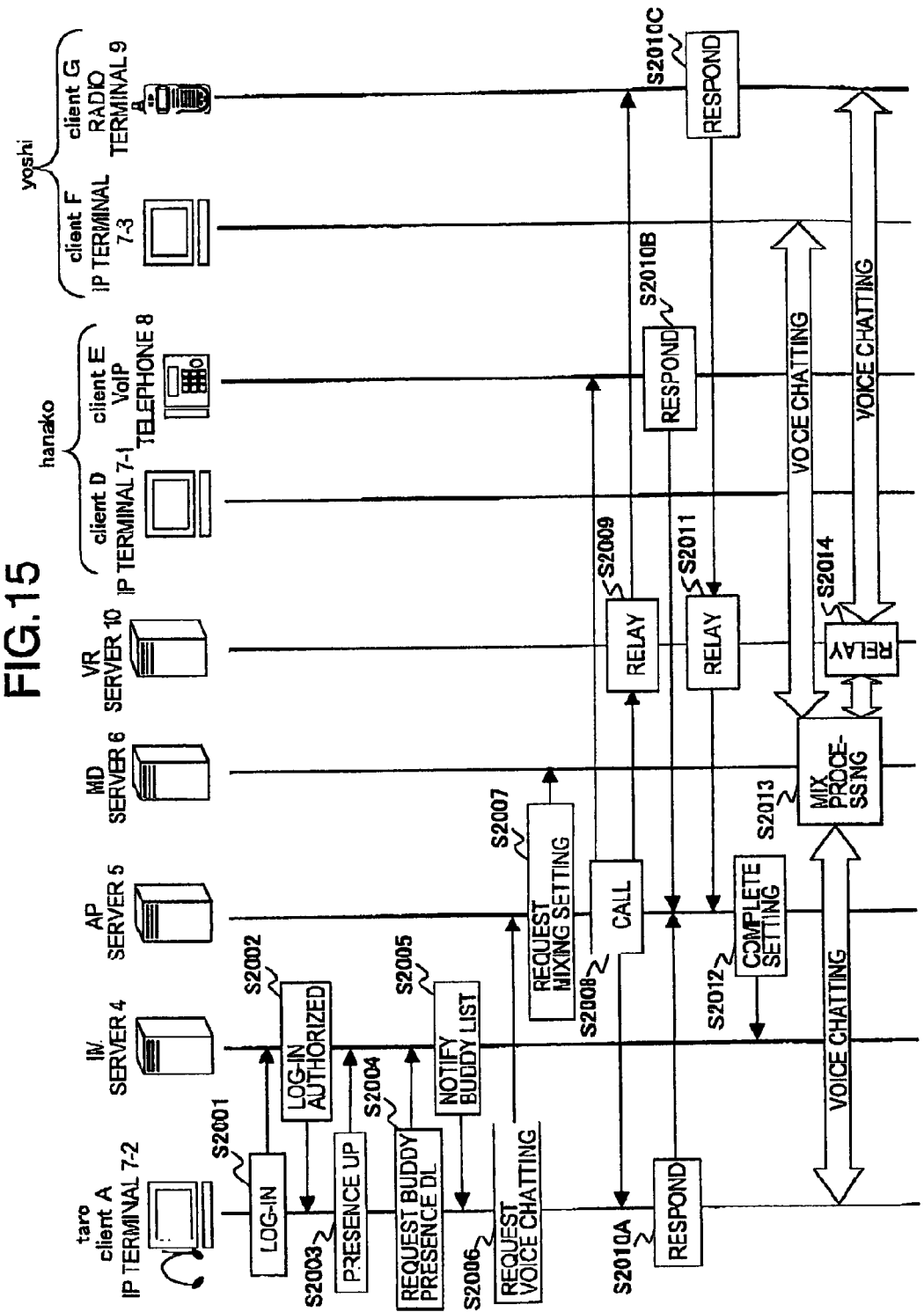
FIG. 15 is a diagram for explaining an operation for using a text chat during a voice chat, which is a second operational example of an IM-VoIP interconnecting system according to one embodiment of the present invention.
Figure 16:
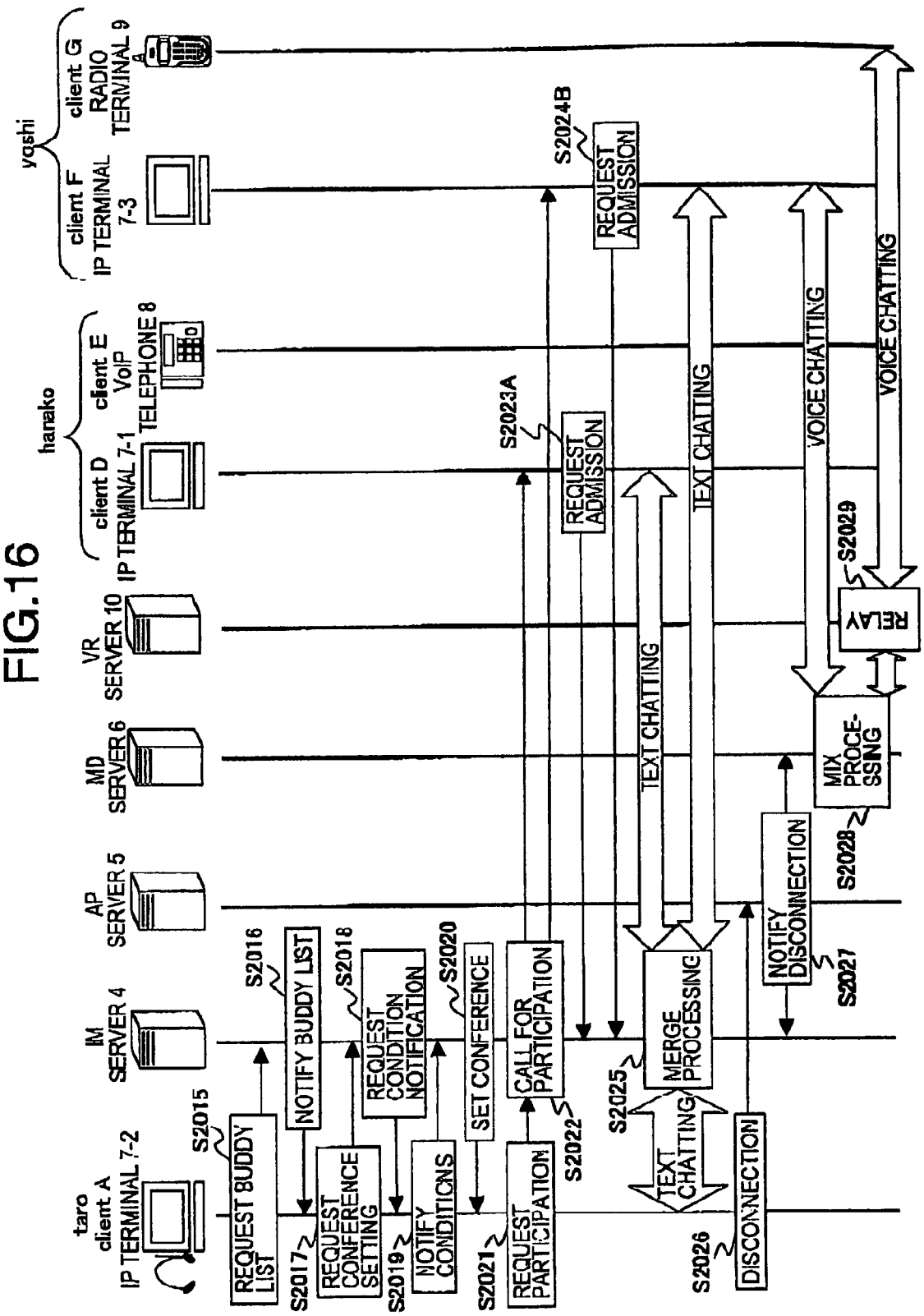
FIG. 16 is a diagram for explaining an operation for using a text chat during a voice chat, which is a second operational example of an IM-VoIP interconnecting system according to one embodiment of the present invention.

FIGS. 15 and 16 are diagrams for describing an operation performed when text chatting is also used during voice chatting, which is the second operational example of the IM-VoIP interconnecting system according to this embodiment.

Here, similar to the first operational example shown in FIGS. 10 and 11, a user having a nickname "taro" participates in an IM by using an IP terminal 7-2 (account name of the IM client: client A) including both a text chatting function and a voice chatting function.

A user having a nickname "hanako" participates in an IM by using an IP terminal 7-1 (account name of the IM client: client D) including only the text chatting function and a VoIP telephone 8 (account name of the IM client: client E). A user having a nickname "yoshi" participates in an IM by using an IP terminal 7-3 (account name of the IM client: client F) including only the text chatting function and a radio terminal 9 (account name of the IM client: client G). The IP terminals 7-1 and 7-3, VoIP telephone 8 and the radio terminal 9 have already logged in the IM server 4.

First of all, the same kinds of processing as those performed in the steps S1001 to S1005 of FIG. 10 are performed. Whereby, logging-in by an IM client installed in the IP terminal 7-2, uploading presence information of the IM client to the IM server 4 and downloading the presence information of buddy IM clients from IM server 4 to the IP terminal 7-2 are performed (S2001 to S2005).

It is assumed that the user "taro" determines an IM client for voice chatting with reference to the presence information of the buddy IM clients displayed in the IP terminal 7-2, and a voice chatting request instruction involving the specification of IM clients (client E and client G) is input. In the IP terminal 7-2, the event analyzing portion 789 detects the instruction and causes the data/command creating portion 792 to create a voice chat request command including various kinds of information (such as the account name, the client address and the client nickname) of the IM client of the user "taro" and IM clients to be invited to the voice chat. The voice chat request command is IP-packetized in the packet assembling portion 792 and is sent to the AP server 5, which is specified by an address registered in the profile data 686, over the IP network 1 (S2006).

After that, the same kinds of processing as those performed in the steps S1017 to S1024 are performed. Voice chatting among the IM client "client A" installed in the IP terminal 7-2, the IM client "client E" installed in the VoIP telephone 8 and the IM client "client G" installed in the radio terminal 9 is started (S2007 to S2014).

In the IP terminal 7-2, when the event analyzing portion 789 receives the instruction for requesting information regarding chat buddies from the user "taro" during the voice chatting, the event analyzing portion 789 causes the data/command creating portion 792 to create a buddy list request command including the account name of the IM client of the user "taro". The request command is IP-packetized in the packet assembling portion 794 and is sent to the IM server 4 specified by an address registered in the profile data 686 (S2015) over the IP network 1.

In the IM server 4, the command processing portion 484 receives the buddy list request command from the IP terminal 7-2 through the packet deassembling portion 481 and the analyzing and data/command distributing portion 482. Then, the command processing portion 484 identifies, from the presence information management table 488, a record 440 in which the account name included in the request command is registered in the field 431 is identified. Furthermore, records 440 in which account names written in the buddy list registered in the field 439 of the record 440 are registered in the field 431 are identified from the presence information management table 488.

Then, the command processing portion 484 causes the output data creating portion 485 to create a buddy list in which information regarding each of the chat buddies is registered including various kinds of information (except for the authentication key at least) registered in each of the identified records 440. The buddy list is IP-packetized in the packet assembling portion 486 and is sent to the IP terminal 7-2, which is the sender of the buddy list request, over the IP network 1 (S2016).

In the IP terminal 7-2, the command processing portion 784 receives the buddy list from the IM server 4 through the packet deassembling portion 781 and the analyzing and voice packet/data/command distributing portion 782. Then, the command processing portion 784 causes the output data creating portion 786 to display data of information written in the buddy list in the display device, whereby the buddy information is notified to the user "taro".

Thus, the user "taro" can check whether or not voice chatting buddies can perform text chatting through the buddy information displayed in the display device and the voice chatting in progress. If the text chatting is possible, the user "taro" can further check which IM client is used for the text chatting (where the IM client can be specified by the account name and the client nickname). It can be checked whether or not a conference room can be set for text chatting in addition to the voice chatting.

Now, it is assumed that, the user "taro" confirmed, from the buddy information displayed in the display device and by exchanging messages through voice chatting, that the users "hanako" and "yoshi" participating in the voice chatting can participate in text chatting by using IM client (the IP terminals 7-1 and 7-3) having the account names "client D" and "client F", respectively. In addition, it is assumed that the user "taro" confirmed that each of the users "hanako" and "yoshi" has an intention to participate in text chatting. Then, it is assumed that an instruction for opening a new conference room for the text chatting is input to the input device 44.

In the IP terminal 7-2, the event analyzing portion 789 detects the instruction and causes the data/command creating portion 792 to create a request command for setting a conference room. After that, the same of processing as those in the steps S1006 to S1009 in FIG. 10 are performed, and the conference room is opened (S2017 to S2020).

After that, in the IP terminal 7-2, the event analyzing portion 789 receives a specification of the account names ("client D" and "client F") of the chat buddies to be invited to the conference room by the user "taro". Then, the same of processing as those in the steps S1010 to S1013 in FIG. 10 are performed and text chatting among the IM client "client A" installed in the IP terminal 7-2, the IM client "client D" installed in the IP terminal 7-1 and the IM client "client F" installed in the IP terminal 7-3 is started (S2021 to S2025).

The processing in steps S2026 to S2029 performed when voice chatting is closed are the same as the processing in the steps S1025 to S1024.

Next, an operation performed for switching from one-to-one voice chatting to multi-party voice chatting will be described as a third operational example of the IM-VoIP interconnecting system according to this embodiment.

Figure 17:
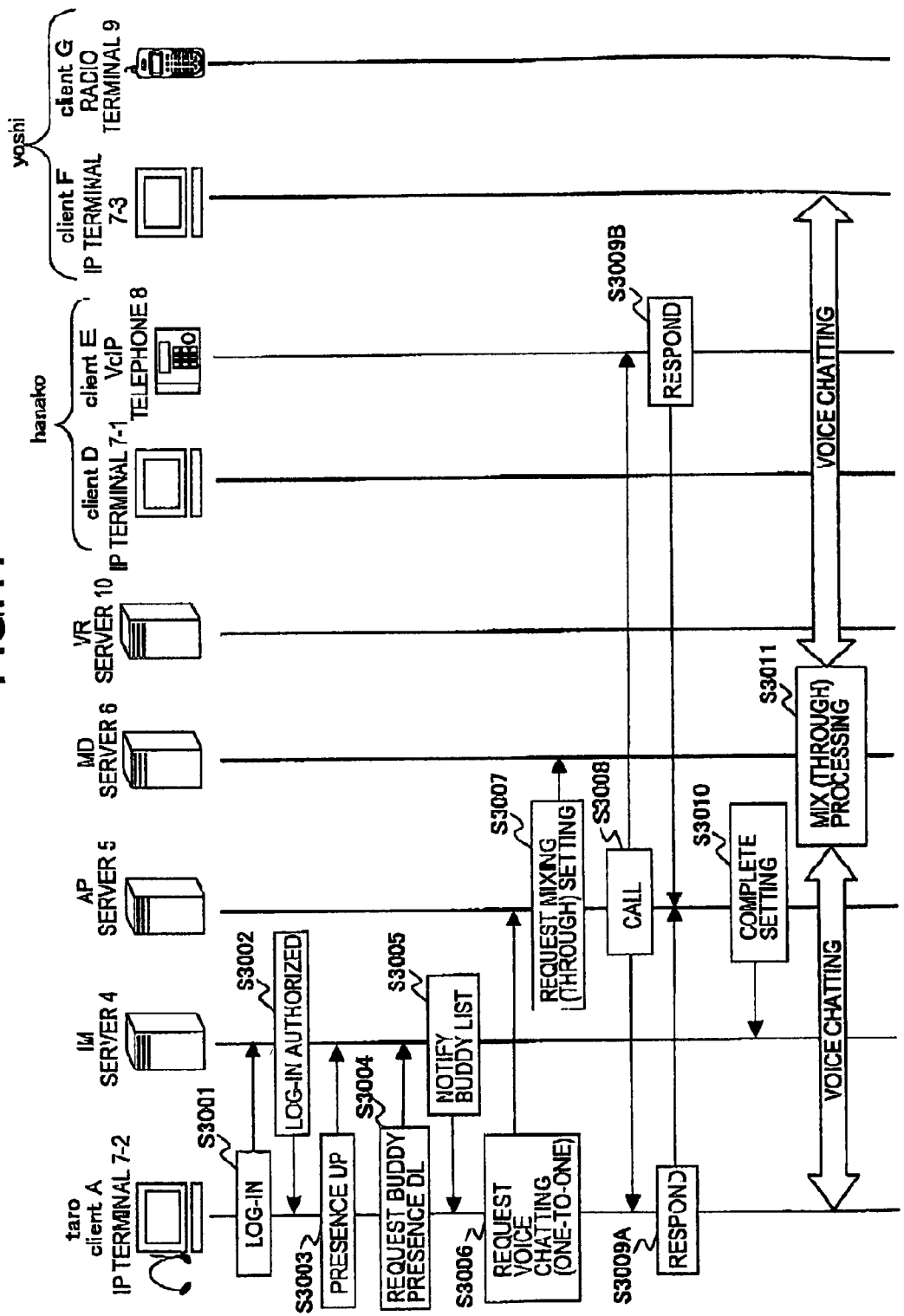
FIG. 17 is a diagram for explaining an operation for switching from a one-to-one voice chat to a multi-party voice chat, which is a third operational example of an IM-VoIP interconnecting system according to one embodiment of the present invention.
Figure 18:
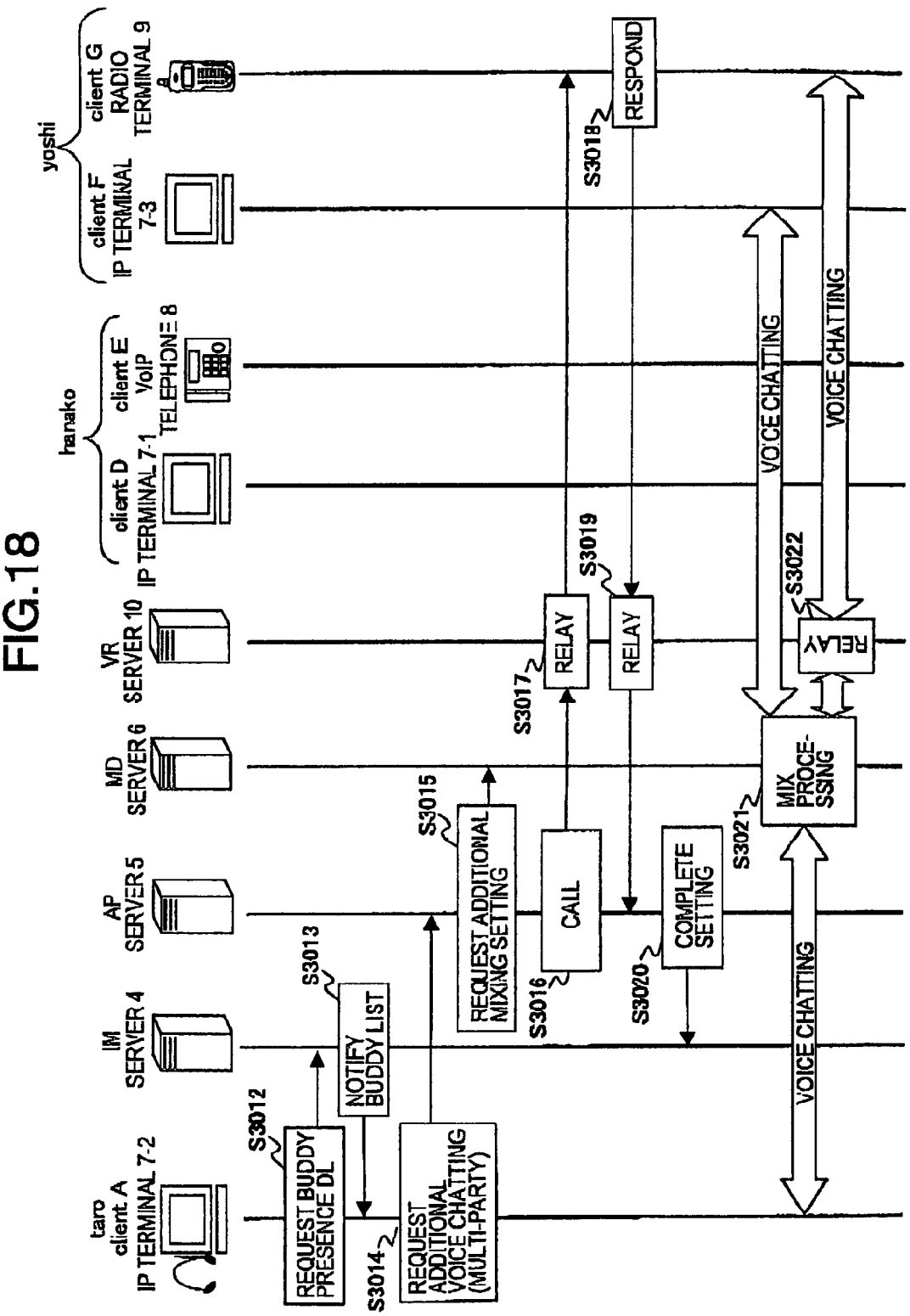
FIG. 18 is a diagram for explaining an operation for switching from a one-to-one voice chat to a multi-party voice chat, which is a third operational example of an IM-VoIP interconnecting system according to one embodiment of the present invention.

FIGS. 17 and 18 are diagrams for describing an operation performed for the switching from one-to-one voice chatting to multi-party voice chatting which will be described as a third operational example of the IM-VoIP interconnecting system according to this embodiment.

Here, similar to the first operational example shown in FIGS. 10 and 11, a user having a nickname "taro" participates in an IM by using an IP terminal 7-2 (account name of the IM client: client A) including both a text chatting function and a voice chatting function. A user having a nickname "hanako" participates in an IM by using an IP terminal 7-1 (account name of the IM client: client D) including only the text chatting function and a VoIP telephone 8 (account name of the IM client: client E). A user having a nickname "yoshi" participates in an IM by using an IP terminal 7-3 (account name of the IM client: client F) including only the text chatting function and a radio terminal 9 (account name of the IM client: client C). The IP terminals 7-1 and 7-3, VoIP telephone 8 and the radio terminal 9 have already logged in the IM server 4.

First of all, the same processing as those performed in the steps S1001 to S1005 are performed, whereby, logging-in by an IM client installed in the IP terminal 7-2, uploading presence information of the IM client to the IM server 4 and downloading the presence information of buddy IM clients from IM server 4 to the IP terminal 7-2 are performed (S3001 to S3005).

It is assumed that the user "taro" determines an IM client to be invited for a 1 to 1 voice chatting with reference to the presence information of the buddy IM clients displayed in the IP terminal 7-2. Then, a voice chatting request instruction involving the specification of IM client (client E) is input. In the IP terminal 7-2, the event analyzing portion 789 detects the instruction and causes the data/command creating portion 792 to create a voice chat request command including various information (such as the account name, the client address and the client nickname) of the IM client of the own user "taro" and IM clients to be invited to the voice chat. The voice chat request command is IP-packetized in the packet assembling portion 792 and is sent to the AP server 5, which is specified by an address registered in the profile data 686, over the IP network 1 (S3006).

After that, the same processing as those performed in the steps S1017 to S1023 are performed (S3007 to S3011). However, because the voice chat request command is requesting one-to-one voice chatting, there are two kinds of information of IM clients included in the command here. Therefore, the mixing processing performed in the MD server 6 is as follows: A voice packet sent from the two IM clients ("client A" and "client E") to the address for voice chatting is input to the voice packet deassembling portion 885 through the packet deassembling portion 881 and the analyzing and voice packet/command distributing portion 882. There, the packet undergoes header processing. Thus, encoded voice data is obtained. Next, the encoded voice data is decoded by the decoder 886 and is input to the mixer 887. The mixer 887 buffers voice data for every two IM clients for a predetermined period of time with respect to the voice packet sent to the same address for voice chatting. In addition, the buffered voice data from one of the IM clients is handled as voice data to the other IM client. The voice data thus created is encoded by the encoder 888 and then is voice-packetized (VoIP-packetized) in the voice packet assembling portion 880. Then, the voice packet is IP-packetized by the packet assembling portion 890 and is sent to the IP network 1. Thus, voice chatting between two IM clients ("client A" and "client E"), that is, between users "taro" and "hanako" is implemented.

Here it is assumed that the user "taro" wants to switch the one-to-one voice chatting with "hanako" to multi-party voice chatting and instructs, to the IP terminal 7-2, a request for downloading presence information of chat buddies. In response to this, in the IP terminal 7-2, the event analyzing portion 789 causes the data/command creating portion 792 to create a request command for downloading presence information of the chat buddies. The download request command is IP-packetized in the packet assembling portion 794 and is sent to the IM server 4, which is specified by an address registered in the profile data 606, over the IP network 1. (S3012).

In the IM server 4, the command processing portion 484 receives the download request command from the IP terminal 7-2 through the packet deassembling portion 481 and the analyzing and data/command distributing portion 482. Then, the command processing portion 484 performs the same processing as that in the S1005 in FIG. 10. Then, the buddy list notification is sent to the IP terminal 7-2 (S3013).

Now, it is assumed that the user "taro" determines the IM client "client G" of the user "yoshi" to be called for the participation in the voice chat with the user "hanako" with reference to the presence information of the buddy IM clients displayed in the IP terminal 7-2. Then, a voice chatting request instruction involving the specification of the IM client (client G) is input. In the IP terminal 7-2, the event analyzing portion 789 detects the instruction and causes the data/command creating portion 192 to create a voice chat additional request command including various information (such as the account name, the client address and the client nickname) of the IM client to be invited to the voice chat and the address for the voice chat used for the voice chat with the IM client "client E". The voice chat additional request command is IP-packetized in the packet assembling portion 794 and is sent to the AP server 5, which is specified by an address registered in the profile data 686, over the IP network 1 (S3014).

In the AP server 5, the analysis processing portion 582 receives the voice chatting additional request command through the packet deassembling portion 581. Then, the analysis processing portion 582 specifies an encoding method registered in the field 534 of the record 540 in which the voice chatting address included in the voice chat additional request command is registered in the field 535 with reference to the connection management table 586. Then, the analysis processing portion 502 causes the output data creating portion 583 to create a mixing additional setting request command including an address of each of the IM clients included in the voice chat additional request command (in this case an address of the VR server 10 because the IM client is installed in the radio terminal 9), a voice chatting address included in the voice chat additional request command, the specified encoding method for encoding voice signals. The mixing additional setting request command is IP-packetized in the packet assembling portion 584 and is sent to the MD server 6 over the IP network 1 (S3015).

In the MD server 6, the command processing portion 883 receives the mixing additional setting request command through the packet deassembling portion 881 and the analyzing and voice packet/command distributing portion 882. Then, the command processing portion 883 sets the voice packet deassembling portion 885, the decoder 886, the mixer 887 and the voice packet assembling portion 889 such that each of the IM clients having the address included in the additional setting request command can participate in the voice chat performed by using the voice chat address included in the additional setting request command.

On the other hand, in the AP server 5, the analyzing processing portion 582 causes the output data creating portion 583 to create a voice chatting calling command for each of the IM clients identified by the addresses included in the voice chatting additional request command received from the ID terminal 7-2. The voice chatting calling command includes an address for voice chatting. The voice chatting calling command is IP-packetized in the packet assembling portion 504 and is sent to each of the IM clients identified by the address included in the voice chatting additional request command, over the IP network 1 (S3016).

Here, since the destination IM client is installed in the radio terminal 9, the voice chat calling command furthers include a telephone number of the radio terminal 9 in which the IM client is installed and so on, in addition to the address for voice chatting. Then, the voice chatting calling command is sent to the VR server 10 identified by the IP address registered along with the telephone number of the radio terminal 9 and so on as a client address. In the VR server 10, when the call control processing portion 987 receives the voice chatting calling command from the AP server 5, it calls to the radio terminal 9 identified by the telephone number, for example, included in the calling command by using a telephone (S3016).

After that, the same processing as that in the steps S1019, A1020C, S1021 and S1022 in FIG. 10 is performed. Then, the setting completion command is sent from the AP server 5 to the IM server 4 (S3017 to S3020). As a result, the voice chatting among three IM clients ("client A", "client E" and "client G"), that is, among users "taro", "hanako" and "yoshi" can be achieved (S3021 and S3022).

Next, an operation for closing a conference room will be described as a fourth operational example of the IM-VoIP interconnecting system according to this embodiment.

Figure 19:
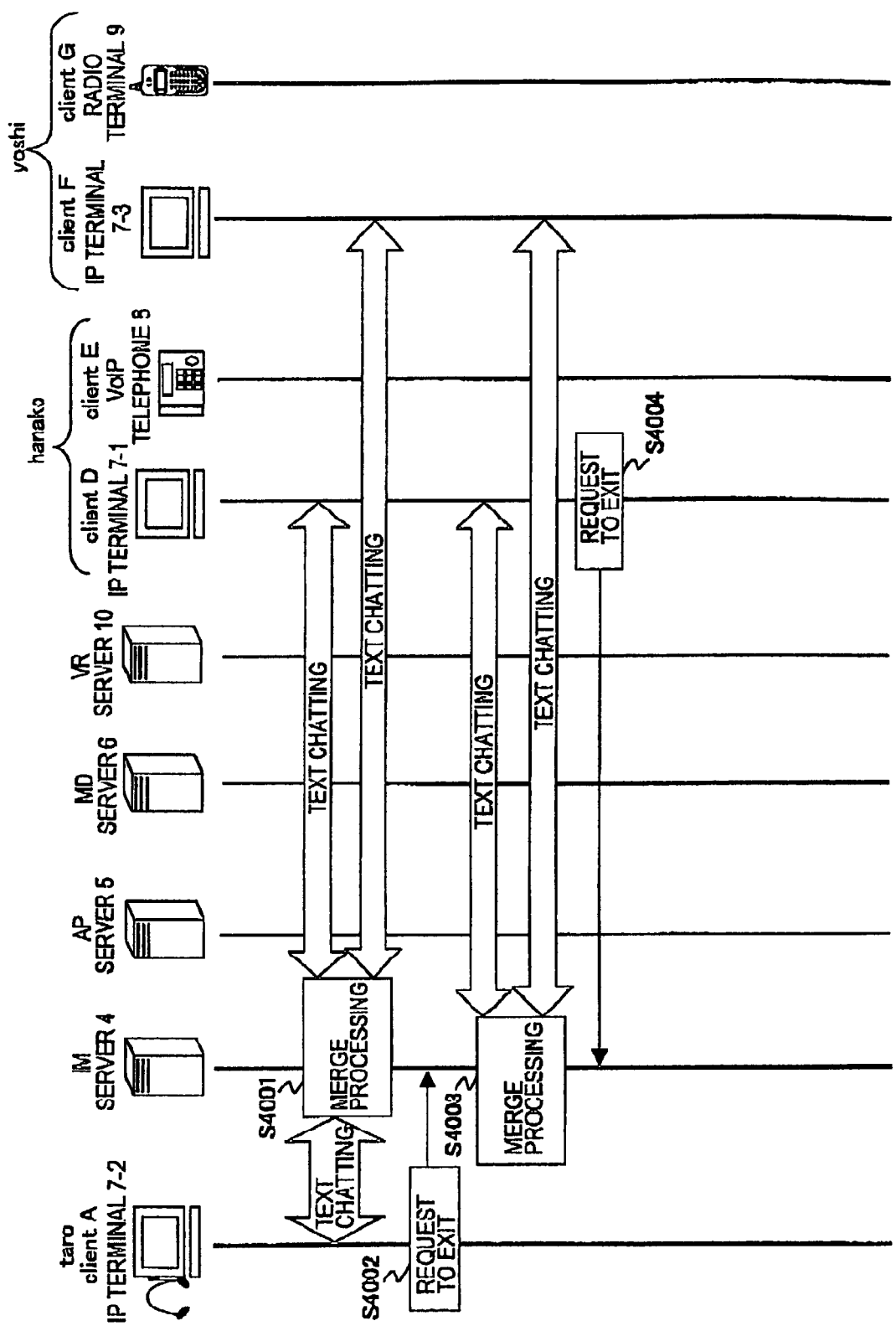
FIG. 19 is a diagram for explaining an operation for closing a conference room, which is a fourth operational example of an IM-VoIP interconnecting system according to one embodiment of the present invention.

FIG. 19 is a diagram for explaining an operation for closing a conference room as the fourth operational example of the IM-VoIP interconnecting systems of this embodiment.

Now, it is assumed that the same processing as that in the steps S1001 to S1012 shown in FIG. 10 is performed and text chatting is performed among three IM clients ("client A", "client D" and "client F"), that is, among the users "taro", "hanako" and "yoshi" (S4001).

In the IP terminal 7-2, when the event analyzing portion 789 receives an instruction for exiting from the conference room from the user "taro", the event analyzing portion 789 causes the data/command creating portion 792 to create the conference exit request command including information (the account name and/or address) of the IM client of the user "taro". The exit request command is IP-packetized in the packet assembling portion 794 and is sent to the IM server 4 specified by the address registered in the profile data 686 (S4002).

In the IM server 4, the command processing portion 484 receives the conference exit request command through the packet deassembling portion 481 and the analyzing and data/command distributing portion 482 and notifies this to the connection management portion 487.

The connection management portion 487 identifies, from the presence information management table 488, a record 440 having the information (account name and/or client address) of the IM client included in the conference exit request command. Then, the information (presence information indicating that the text chat is in progress, which is registered in the field 435, the address of the conference room, which is registered in the field 437, and the conference nickname, which is registered in the field 438) relating to the conference room registered in the identified record 440 is deleted. As a result, when the corresponding IM client is no longer chatting, information indicating the idle state is registered in the field 435.

The connection management portion 487 controls data processing portion 483 to terminate processing for synthesizing and distributing text data to the IM client "client A" included in the conference exit requesting command. As a result, the text chatting is only performed between the IP terminal 7-1 (IM client "client D") and the IP terminal 7-3 (IM client "client F") (S4003). When the IP terminals 7-1 and 7-2 end the text chatting, the same processing as the processing for the IP terminal 7-2 is performed (S4004). When all of the IM clients exit from the conference room, the address assigned to the conference room is deleted from the presence information management table 488, and the address is released.

In this way, one embodiment of the present invention has been described above.

The IM-VoIP interconnecting system according to this embodiment includes the IM server 4 for managing presence information of IM clients, the AP server 5 for managing connection for voice chatting using VoIP and the MD server 6 for achieving multi-party voice communication by mixing voice data.

The IM server 4 is adjusted to manage information on usable media for chatting by each IM client and information (nickname) of a user of each client as well as presence information of each IM client. Thus, each IM client can obtain these information. Therefore, the user of each IM client can check the media usable for chatting and the user of each IM client. Thus, it can be checked what kind of chatting (text chatting and voice chatting) a buddy user can perform by using which IM client.

In order to perform text chatting, an IM client notifies to IM server 4 information of each IM client participating in the text chatting. In response to this, the IM server 4 manages a connection between each of the IM clients participating in the text chatting and the IM server. Then, the IM server 4 merges text messages sent from each of the IM clients, and the result is distributed to each of the IM client.

On the other hand, in order to perform voice chatting, an IM client or an IM server on behalf of the IM client notifies to the AP server 5, information of each IM client participating in the voice chatting. In response to this, the AP server 5 manages a connection between each IM client participating in the voice chatting and the MD server 6. The MD server 6 mixes voice data sent from each IM client except for the focused IM client. Then, the processing for distributing the result to the focused IM client is performed for all of the IM clients participating in the voice chatting.

Therefore, according to this embodiment, both of text chatting and voice chatting can be used. In addition, the switching between text chatting and voice chatting and/or the transition between one-to-one chatting and group chatting can be performed flexibly. In this way, according to this embodiment, the usage of the communication system can be improved.

Notably, the present invention is not limited to the embodiment, and a number of variations are possible within the scope of the principle.

For example, the embodiment has been described by using the case where the IM server 4, the AP server 5 and the MD server 6 are constructed on different computer systems, respectively. However, the present invention is not limited thereto. The AP server 5 and the MD server 6 may be constructed on one computer system. Alternatively, the AP server 5 and the MD server 6 may be constructed on a network system, which is configured on the network system constructed by the network-connected computer systems. The IM server 4 may be constructed on the computer system in which the AP server 5 and the MD server 6 are constructed.

In addition, the embodiment assumes voice chatting and text chatting as media usable for chatting. However, the present invention is not limited thereto. The present invention can be applied for chatting using images. The system for the above-described voice chatting may be applied to the system for video chatting.

As described above, the present invention can improve the usage of communication systems.

What is claimed is:

1. A communication system for implementing a chat between/among Instant Messaging (IM) clients, comprising:
    an IM presence management server which manages presence information indicating a state of each of the IM clients;
    a VoIP communication connection management server which manages a connection for voice chatting using VoIP (Voice over Internet Protocol); and
    a media server which implements multi-party voice communication by mixing voice data,
    wherein, the IM presence management server:
    manages, as to each of the IM clients, the presence information, information regarding media (including text and voice) usable for chatting and user information of the IM client;
    provides, in accordance with an instruction from one of the IM clients, said one IM client with the presence information, the information regarding media usable for chatting and user information of each of the IM clients which are set as buddies of said one IM client;
    manages, in accordance with information of each of IM clients (called as text participating clients) participating in a text chat, which is notified from one of the IM clients, a connection between/among the text participating clients and the IM presence management server; and
    merges text data sent from each of the text participating clients to distribute the result to each of the text participating clients,
    wherein, the VoIP communication connection management server manages a connection between/among each of the voice participating clients and the media server in accordance with information of each of the IM clients (called as voice participating clients) participating in a voice chat, which is notified from one of the IM client or the IM presence management server, and
    wherein, the media server performs, as to each of the voice participating clients, processing for mixing voice data sent from the voice participating clients except for the client in question (called as a focused client) to distribute the result to the focused client.

2. A communication system according to claim 1, wherein the media server obtains the information regarding the voice participating clients from the VoIP communication connection management server.

3. A communication system according to claim 1, wherein the IM presence management server determines each of the voice participating clients that will participate in a voice chat on the basis of the presence information and the information regarding media usable for chatting, regarding each of the IM clients set as a buddy of the IM client which calls for the voice chat, to notifie the information regarding each of the voice participating clients to the VoIP communication connection management server.

4. A communication system according to claim 1, wherein the IM presence management server stops, in accordance with an instruction from one of the text participating clients, management of a connection to said one and merge processing of text data sent from said one with text data sent from the other text participating clients.

5. A communication system according to claim 1, wherein the VoIP communication connection management server stops, in accordance with an instruction from one of the voice participating clients, management of a connection to said one, and
wherein the media server stops mix processing of voice data sent from said one, whose connection management is stopped by the VoIP communication connection management server with voice data from the other voice participating clients and stops processing for dealing said one as the focused client.

6. An IM presence management server used for the communication system according to claim 1.

7. A VoIP communication connection management server used for the communication system according to claim 1.

8. A media server used for the communication system according to claim 1.

9. A computer readable medium having a program, which constructs the IM presence management server used for the communication system according to claim 1 on a computer.

10. A computer readable medium having a program, which constructs the VoIP communication connection management server used for a communication system according to claim 1 on a computer system.

11. A computer readable medium having a program, which constructs the media server used for a communication system according to claim 1 on a computer system.

12. A communication method for implementing a chat between/among Instant Messaging (IM) clients by using:
    an IM presence management server which manages presence information indicating a state of each of the IM clients;
    a VoIP communication connection management server which manages a connection for voice chatting using VoIP (Voice over Internet Protocol); and
    a media server which implements multi-party voice communication by mixing voice data,
    wherein, the IM presence management server performs processing of:
    managing, as to each of the IM clients, the presence information, information regarding media (including text and voice) usable for chatting, and user information of the IM client;
    providing, in accordance with an instruction from one of the IM clients, said one IM client with the presence information, the information regarding media usable for chatting and the user information of each of the IM clients which are set as buddies of said one IM client;
    managing, in accordance with information of each of IM clients (called as text participating clients) participating in a text chat, which is notified from one of the IM clients, a connection between/among the text participating clients and the IM presence management server; and merging text data sent from each of the text participating clients to distribute the result to each of the text participating clients, wherein the VoIP communication connection management server performs processing of:

managing a connection between/among each of the voice participating clients and the media server in accordance with information of each of the IM clients (called as voice participating clients) participating in a voice chat, which is notified from one of the IM clients or the IM presence management server, and wherein the media server performs processing of:

as to each of the voice participating clients, mixing voice data sent from the voice participating clients except for the client in question (called as a focused client) to distribute the result to the focused client.

* * * * *